(12) United States Patent
Do

(10) Patent No.: US 6,980,372 B1
(45) Date of Patent: Dec. 27, 2005

(54) IMAGING LENS

(75) Inventor: Satoshi Do, Saitama (JP)

(73) Assignee: Satoshi Do and Milestone Co., Ltd., Saitama (JP)

( * ) Notice: Subject to any disclaimer, the term of this patent is extended or adjusted under 35 U.S.C. 154(b) by 0 days.

(21) Appl. No.: 10/994,092

(22) Filed: Nov. 22, 2004

(30) Foreign Application Priority Data

Jun. 2, 2004 (JP) .............................. 2004-164599

(51) Int. Cl.⁷ .......................... G02B 9/12; G02B 3/02; G02B 13/04
(52) U.S. Cl. ..................... 359/716; 359/784; 359/753
(58) Field of Search .................... 359/784, 785, 359/716, 753, 790

(56) References Cited

U.S. PATENT DOCUMENTS

| 6,795,253 B2 * | 9/2004 | Shinohara .................... 359/716 |
| 2004/0179274 A1 | 9/2004 | Takahiro |

FOREIGN PATENT DOCUMENTS

| EP | 0 989 417 A | 3/2000 |
| JP | 10-301021 | 11/1998 |
| JP | 10-301022 | 11/1998 |
| JP | 2001-075006 | 3/2001 |
| JP | 2002-221659 | 8/2002 |
| JP | 2002-244030 | 8/2002 |
| JP | 2003-149545 | 5/2003 |
| JP | 2003-149548 | 5/2003 |
| JP | 2003-322792 | 11/2003 |
| WO | WO 2004/038478 | 5/2004 |

* cited by examiner

*Primary Examiner*—Georgia Epps
*Assistant Examiner*—Jack Dinh
(74) *Attorney, Agent, or Firm*—Venable, LLP; James R. Burdett

(57) ABSTRACT

The present invention is an imaging lens in which various aberrations are favorably corrected, the optical length is short, and a sufficient back focus is secured. The imaging lens is constituted by arranging a first lens L1, an aperture diaphragm S1, a second lens L2, and a third lens L3 in succession from the object side to the image side. The first lens L1 is a lens having a positive refractive power and a meniscus shape in which the convex surface faces the object side, the second lens L2 is a lens having a negative refractive power and a meniscus shape in which the convex surface faces the image side, and the third lens L3 is a lens in which the convex surface faces the object side.

5 Claims, 20 Drawing Sheets

IMAGING LENS

BACKGROUND OF THE INVENTION

1. Field of the Invention

The present invention relates to an imaging lens, and more particularly to an imaging lens which is suitable for installation into an image input device of a portable telephone or personal computer, a digital camera, a CCD (charge-coupled device) camera used for monitoring purposes, a surveying device, or similar which uses a CCD or CMOS (complementary metal-oxide semiconductor) as an imaging device.

2. Description of Related Art

In such an imaging lens, the optical length, which is defined as the distance from the entrance surface on the object side of the imaging lens to the imaging surface (the image-forming surface of a CCD or the like), must be short. In other words, during design of the lens, a method of reducing the ratio of the optical length to the combined focal length of the imaging lens is required. An imaging lens having a short optical length and a small optical length to focal length ratio will occasionally be referred to as a compact lens below.

Taking a portable telephone as an example, the optical length must at least be shorter than the thickness of the portable telephone body. Meanwhile, the back focus, which is defined as the distance from the exit surface on the image side of the imaging lens to the imaging surface, is preferably as long as possible. In other words, during design of the lens, a method of increasing the ratio of the back focus to the focal length as much as possible is required. This is due to the need to insert components such as a filter or cover glass between the imaging lens and the imaging surface.

As well as the points described above, there is also demand for imaging lenses in which various types of aberration have been corrected to such a small degree that image warping is not visually recognizable and that is required by the integration density of imaging elements (also known as "pixels"). In other words, favorable aberration correction is required, and images in which such aberration correction has been performed favorably will occasionally be referred to as "favorable images" below.

As will be described below, imaging lenses with a three-layer structure which are suitable for use in imaging devices such as portable computers, video telephones, or similar using a solid-state imaging device such as a CCD or CMOS have been disclosed. These lenses all secure a wide viewing angle, and are compact and lightweight.

Of these lenses, an imaging lens capable of obtaining images with favorably corrected aberration while securing a wide viewing angle has been disclosed as a first three-layer lens (see, for example, Japanese Unexamined Patent Application Publication 2001-075006).

However, the refractive power of these three lenses, which are constituted by first, second, and third lenses arrayed in succession from the object side, is positive in the first lens, negative in the second lens, and positive in the third lens, and hence the distance (optical length) from the surface of the first lens on the object side to the imaging surface is too long. Further, a diaphragm is disposed on the object-side surface of the first lens, and hence the effective diameter of the third lens cannot be reduced. As a result, a compact lens cannot be produced.

Imaging lenses in which aberration is favorably corrected and a short focus is realized while securing a wide viewing angle have been respectively disclosed as second through fourth three-layer lenses (see, for example, Japanese Unexamined Patent Application Publication 2003-149548, Japanese Unexamined Patent Application Publication 2002-221659, and Japanese Unexamined Patent Application Publication 2002-244030).

However, similarly to the imaging lens described above, the refractive power of the three lenses of these imaging lenses, constituted by first, second, and third lenses arranged in succession from the object side, is positive in the first lens, negative in the second lens, and positive in the third lens. Hence, although these imaging lenses are set with a short combined imaging lens focal length, the back focus is long, and thus the optical length is too long. In addition, these lenses use glass materials, and are therefore expensive.

An imaging lens which uses aspheric lenses and is reduced in size by appropriately setting power distribution and surface shape has been disclosed as a fifth three-layer lens (see, for example, Japanese Unexamined Patent Application Publication 2003-149545).

However, the refractive power of the three lenses of this imaging lens, constituted by first, second, and third lenses arranged in succession from the object side, is negative in the first lens, positive in the second lens, and negative in the third lens. As a result, the imaging lens has a long optical length. In addition, the lenses use glass materials, and are therefore expensive.

A lens in which a pair of meniscus lenses whose concave surfaces face each other are constituted by plastic lenses each having at least one aspheric surface, and in which the entire lens system has a three-layer structure, has been disclosed as a sixth three-layer lens (see, for example, Japanese Unexamined patent Application Publication H10-301022). This lens achieves compactness and low cost, and is capable of suppressing focus movement due to temperature change with ease.

However, the refractive power of the three lenses in this imaging lens, which are arranged as first, second, and third lenses in succession from the object side, is weak in the first lens, weak in the second lens, and positive in the third lens, and hence the refractive power of the first lens and second lens cannot be fully compensated for by the third lens alone. As a result, the back focus lengthens, causing an increase in the optical length. Furthermore, the third lens uses a glass material, and hence cost reduction is incomplete.

A low-cost lens system with a short optical length which has a telephoto-type lens constitution in which the entire lens system is divided into a front group and a rear group, the front group having a positive refractive power and the rear group having a negative refractive power, has been disclosed as a seventh three-layer lens (see, for example, Japanese Unexamined Patent Application Publication H10-301021).

However, the refractive power of the three lenses in this lens system, which are arranged as first, second, and third lenses in succession from the object side, is negative in the first lens, positive in the second lens, and negative in the third lens, and the distance between the second lens and third lens is wide. As a result, the optical length is long, and the aperture of the third lens widens. This is unsuitable for installation in image input devices of portable telephones or personal computers, digital cameras, CCD cameras used for monitoring purposes, surveying devices, and so on.

An imaging lens comprising, in succession from the object side, two positive lenses, and a negative lens whose concave surface faces the image side, both surfaces of which are aspheric and the negative power of which gradually weakens from the center of the lens toward the periphery so as to have a positive power on the periphery, has been disclosed as an eighth three-layer lens (see, for example, Japanese Unexamined Patent Application Publication 2003-322792).

In this lens system, however, the lens corresponding to a third lens L3 gradually weakens in negative power from the center of the lens toward the periphery, and the position where the negative power turns into positive power exists within a range of between 0.7 times and 1.0 times the effective diameter of the lens from the center of the lens. In the lens disclosed in the embodiments of the invention, the positions where the negative power turns into positive power are set respectively at 0.96 and 0.97 times the effective diameter of the lens from the center of the lens, i.e. substantially at the periphery of the lens.

By setting the position where negative power turns into positive power at the peripheral portion of the lens, light entering the vicinity of the intersecting point between the optical axis of the lens and the imaging surface and the periphery of the lens has an almost right-angled angle of incidence onto the imaging device, whereas in an intermediate position between the intersecting point of the optical axis of the lens and the imaging surface and the periphery of the lens, the angle of incidence onto the imaging device deviates greatly from a right angle. Since the angle of incidence of the light entering an intermediate position from the peripheral portion of the lens, which forms an important part of an image, deviates greatly from a right angle, the light enters the imaging device in a diagonal direction to the imaging device, thereby increasing the amount of reflection on the entrance surface such that the light reaching a photoelectric conversion surface of the imaging device is low in energy. As a result, this part of the image becomes dark.

It is therefore an object of the present invention to provide an imaging lens which is suitable for installation in a camera using a CCD or CMOS as an imaging device, which has a short optical length (a small optical length to focal length ratio), a back focus which is as long as possible (a back focus to focal length ratio which is as large as possible), and which is thus capable of obtaining favorable images.

A further object of the present invention is to provide an imaging lens in which all of the (three) lenses constituting the imaging lens of the invention are made of plastic materials to thereby reduce cost and weight. Here, "plastic materials" refers to high polymeric substances which are transparent to visible light, and may be molded by being subjected to plastic deformation through application of heat, pressure, or both, and thereby formed into lenses.

SUMMARY OF THE INVENTION

In order to achieve the objects described above, an imaging lens according to the present invention is constituted by arranging a first lens L1, an aperture diaphragm S1, a second lens L2, and a third lens L3 in succession from the object side to the image side. The first lens L1 is a lens having a positive refractive power and a meniscus shape in which the convex surface faces the object side. The second lens L2 is a lens having a negative refractive power and a meniscus shape in which the convex surface faces the image side. The third lens L3 is a lens in which the convex surface faces the object side.

Further, both surfaces of the first lens L1, both surfaces of the second lens L2, and at least one surface of the third lens L3 are constituted by aspheric surfaces.

According to constitutional examples of the present invention, this imaging lens satisfies the following conditions (1) through (5).

$$0.35 < r_1/r_2 < 0.45 \quad (1)$$

$$0.07 < D_2/f < 0.1 \quad (2)$$

$$0.01 < D_4/f < 0.04 \quad (3)$$

$$1.00 < d/f < 1.30 \quad (4)$$

$$0.3 < b_f/f < 0.5 \quad (5)$$

where
- f is the combined focal length of the imaging lens,
- $r_1$ is the radius of curvature (axial radius of curvature) of the object-side surface of the first lens L1 in the vicinity of the optical axis,
- $r_2$ is the radius of curvature (axial radius of curvature) of the image-side surface of the first lens L1 in the vicinity of the optical axis,
- $D_2$ is the distance from the first lens L1 to the second lens L2,
- $D_4$ is the distance from the second lens L2 to the third lens L3,
- d is the distance (atmospheric) from the object-side surface of the first lens L1 to the imaging surface, and
- $b_f$ is the distance (atmospheric) from the image-side surface of the third lens L3 to the imaging surface.

The back focus $b_f$, which is defined as the distance from the exit surface on the image side of the imaging lens to the imaging surface, is defined here as the distance from the image-side surface $r_8$ of the third lens L3 to the imaging surface $r_{11}$.

Further, the first lens L1, second lens L2, and third lens L3 are preferably constituted by lenses formed from a material having an Abbe number within a range of thirty to sixty. It is also preferable that the first lens L1, second lens L2, and third lens L3 be constituted by lenses formed using a cycloolefin plastics or a polycarbonate as a material.

Further, the first lens L1 and third lens L3 are preferably constituted as lenses formed using cycloolefin plastics as a material, the second lens L2 is preferably constituted as a lens formed using a polycarbonate as a material, and the third lens L3 is preferably constituted by a lens having a negative refractive power and a meniscus shape in which the convex surface faces the object side.

It was clarified through simulation that by constituting the first lens L1 by a lens having a positive refractive power and a meniscus shape in which the convex surface faces the object side, constituting the second lens L2 by a lens having a negative refractive power and a meniscus shape in which the convex surface faces the image side, and constituting the third lens L3 by a lens in which the convex surface faces the object side, an optical length d can be shortened. It was also learned through simulation that by forming the second lens L2 using a material having a higher refractivity than the refractivity of the material of the first lens L1 and a smaller Abbe number than the Abbe number of the material of the first lens L1, chromatic and spherical aberration can be reduced effectively.

The effects on the imaging lens of the present invention exhibited by the conditional expressions (1) through (5) are as follows.

The conditional expression (1) mentioned above is a condition for determining the ratio $r_1/r_2$ of the axial radius of curvature $r_1$ of the first surface of the first lens L1 and the axial radius of curvature $r_2$ of the second surface of the first lens L1. If the ratio $r_1/r_2$ is larger than the lower limit provided by the conditional expression (1), then the back focus of the imaging lens is sufficient for inserting a component such as a cover glass or filter between the imaging lens and the imaging surface, and thus the back focus can be set within a range which does not impair the compactness of the device into which the imaging lens is to be installed. Moreover, distortion can be reduced sufficiently, and hence manufacturing of the first surface of the first lens L1 is facilitated.

If the ratio $r_1/r_2$ is smaller than the upper limit provided by the conditional expression (1), then the absolute distortion value is sufficiently small. Furthermore, in this case, distortion can be reduced sufficiently without increasing the number of aspheric elements.

The conditional expression (2) mentioned above is for defining the allowable range of the distance $D_2$ between the first lens L1 and second lens L2 by $D_2/f$, which is standardized by the combined focal length f of the imaging lens. If $D_2/f$ is larger than the lower limit provided by the conditional expression (2), then the distance between the image-side surface $r_2$ of the first lens L1 and the object-side surface $r_5$ of the second lens L2 can be secured as a sufficient distance for inserting the aperture diaphragm S1. In other words, the outer forms of the first lens L1 and second lens L2 do not have to be reduced to the extent that manufacture becomes difficult, and a sufficient space for inserting the aperture diaphragm S1 can be ensured.

If $D_2/f$ is smaller than the upper limit provided by the conditional expression (2), then there is no need to increase the outer form of the first lens L1 and second lens L2, and hence the imaging lens can be made compact. Further, imaging surface distortion does not increase, and hence favorable images are obtained.

The conditional expression (3) mentioned above is for defining the allowable range of the distance $D_4$ between the second lens L2 and the third lens L3 by $D_4/f$, which is standardized by the combined focal length f of the imaging lens. If $D_4/f$ is larger than the lower limit provided by the conditional expression (3), then the gradient of the light rays entering the imaging surface in relation to the optical axis can be reduced, and hence the shading phenomenon whereby light is obstructed around the periphery of the lens such that the peripheral parts of the image become dark can be avoided.

If $D_4/f$ is smaller than the upper limit provided by the conditional expression (3), then distortion does not increase, and hence favorable images are obtained. Moreover, the effective diameter of the third lens L3 can be reduced, and hence the imaging lens can be made compact.

The conditional expression (4) illustrated above is for defining the allowable range of the distance (atmospheric) d from the object-side surface of the first lens L1 to the imaging surface by d/f, which is standardized by the combined focal length f of the imaging lens. The notation "distance (atmospheric) d" used in reference to the distance d from the object-side surface of the first lens L1 to the imaging surface signifies the distance from the object-side surface of the first lens L1 to the imaging surface measured on the condition that no transparent object (a cover glass or the like) other than air be inserted between the object-side surface of the first lens L1 and the imaging surface.

If d/f is larger than the lower limit provided by the conditional expression (4), then there is no need to reduce the thickness of the first lens L1, second lens L2, and third lens L3, and hence it does not become difficult to distribute resin over a die during formation of the resin lenses. If d/f is smaller than the upper limit provided by the conditional expression (4), then the problem of the amount of light on the periphery of the lens being less than that in the central portion of the lens does not arise. Thus the amount of light on the periphery of the lenses can be increased without increasing the size of the outer forms of the first lens L1, second lens L2, and third lens L3, which are the constituent lenses of the imaging lens. As a result, the imaging lens can be made compact.

The conditional expression (5) mentioned above is for defining the length of the back focus $b_f$ in relation to the combined focal length f of the imaging lens. If the length of the back focus $b_f$ is within the range provided by the conditional expression (5), then a component such as a filter, which is often required in image input devices of portable telephones and the like, can be inserted between the imaging lens and the imaging surface.

By providing a lens constitution which satisfies the five conditions in the conditional expressions (1) to (5) mentioned above, the problems described above can be solved, and a compact imaging lens which is small yet capable of obtaining favorable images can be provided.

Further, by constituting the first lens L1, second lens L2, and third lens L3 by lenses formed from a material having an Abbe number within a range of thirty to sixty, more favorable images are obtained more easily than when the lenses are manufactured using a material with an Abbe number outside of this range. The Abbe number of cycloolefin plastics is 56.2, and the Abbe number of polycarbonate is 30.0, and hence these materials may be used for the imaging lens of the present invention. It is known that cycloolefin plastics or polycarbonate material is suitable for forming lenses using a well-established injection molding method. Needless to say, the present invention is not limited to a specific plastic material, and any plastic material or molded glass material having an Abbe number of between thirty and sixty may be used.

Polycarbonate has a higher refractivity and a smaller Abbe number than cycloolefin plastics. Hence, by forming the first lens L1 and third lens L3 from cycloolefin plastics and forming the second lens L2 from polycarbonate, the optical length can be shortened, and the resolution can be further increased.

Moreover, by constituting the first lens L1 and third lens L3 by lenses formed using cycloolefin plastics, constituting the second lens L2 by a lens formed using polycarbonate, and constituting the third lens L3 by a lens having a negative refractive power and a meniscus shape in which the convex surface faces the object side, the optical length can be shortened more reliably, and an imaging lens having a high resolution can be realized. This will be described in further detail below.

BRIEF DESCRIPTION OF THE DRAWINGS

The foregoing and other objects, features and advantages of the present invention will be better understood from the following description taken in connection with the accompanying drawings, in which.

DESCRIPTION OF THE PREFERRED EMBODIMENTS

Figure 1:
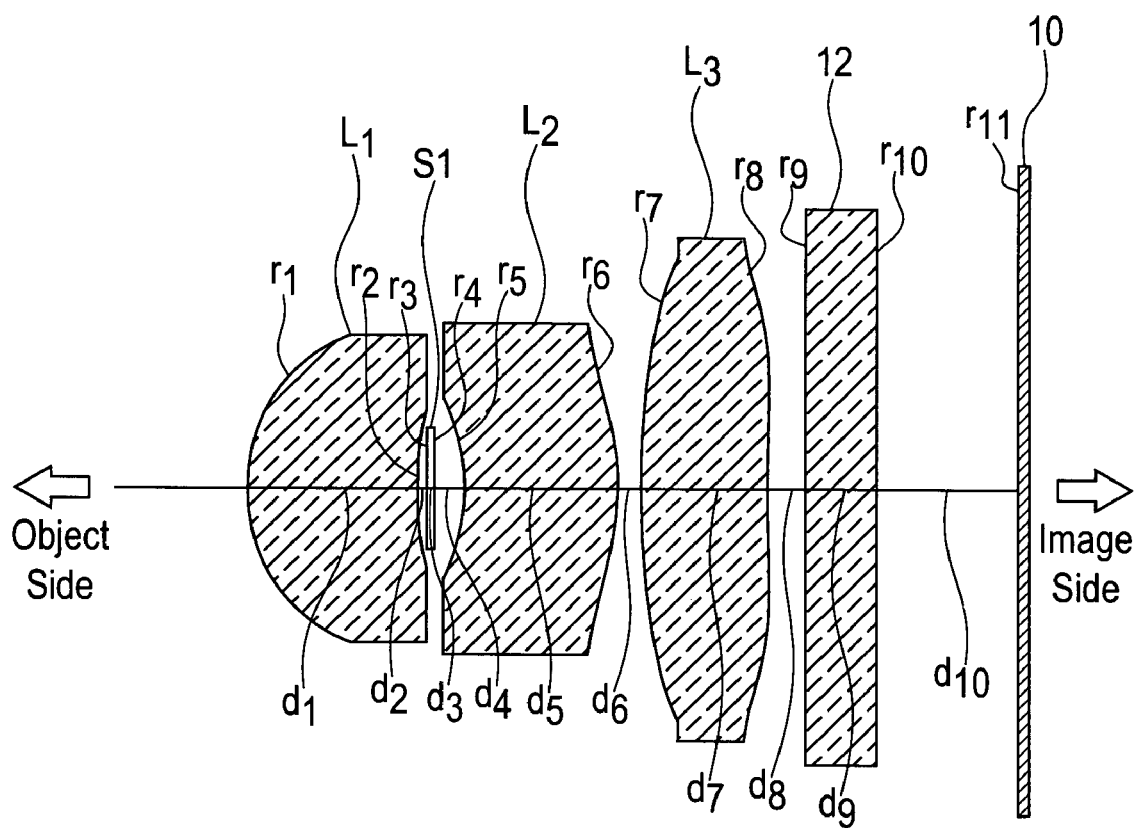
FIG. 1 is a sectional view of an imaging lens according to the present invention.

Embodiments of the present invention will be described below with reference to the drawings. Note that in the drawings, the form, magnitude, and positional relationships of each constitutional element are merely illustrated schematically in order to facilitate understanding of the invention, and the numerical conditions and other conditions to be described below are merely preferred examples thereof. Accordingly, the present invention is in no way limited to or by the embodiments of the invention.

FIG. 1 is a constitutional diagram of an imaging lens according to the present invention. The reference symbols defined in FIG. 1, which indicate surface numbers, surface distances, and so on, are also used in FIGS. 2, 6, 10, 14, 18, and 22.

From the object side, first, second, and third lenses are indicated by the reference symbols L1, L2, and L3 respectively. An imaging device constituting the imaging surface is indicated by the numeral 10, a cover glass separating the imaging surface and lens system is indicated by the numeral 12, and an aperture diaphragm is indicated by the symbol S1. The surfaces of the aperture diaphragm S1 are indicated by $r_3$ and $r_4$. The symbol $r_i$ (i=1, 2, 3, . . . , 11) is used as both a variable representing an axial radius of curvature value and a symbol identifying a lens, cover glass, or imaging surface (for example, $r_1$ is used to represent the object-side surface of the first lens and so on) provided that no confusion is caused thereby.

Parameters shown in the drawing such as $r_i$ (where i=1, 2, 3, . . . , 11) and d1 (where i=1, 2, 3, . . . , 10) are provided as specific numerical values in the following Tables 1 through 6. The suffix i corresponds to the surface numbers of each lens, the lens thickness, the lens distance, or similar, in succession from the object side to the image side.

More specifically:

$r_i$ is the axial radius of curvature of the ith surface;

$d_i$ is the distance from the ith surface to the $(i+1)^{th}$ surface;

Ni is the refractive index of the lens material constituted by the ith surface and the $(i+1)^{th}$ surface; and vi is the Abbe number of the lens material constituted by the ith surface and the $(i+1)^{th}$ surface.

The optical length d is a value obtained by adding together the distances from $d_1$ through $d_7$, and further adding the back focus $b_f$ thereto. The back focus $b_f$ is the distance from the image-side surface of the third lens L3 to the imaging surface on the optical axis. It is assumed that the back focus $b_f$ is measured with the cover glass 12 that is inserted between the third lens L3 and the imaging surface removed. More specifically, since the cover glass has a refractive index of more than one, the geometrical distance from the image-side surface of the third lens L3 to the imaging surface is longer when the cover glass is inserted than when the cover glass is removed. The extent to which the distance increases is determined by the refractive index and thickness of the inserted cover glass. Hence, in order to define the back focus $b_f$ as a value which is unique to the imaging lens and does not depend on the presence or absence of a cover glass, a value measured with the cover glass removed is used. The distance $D_2$ between the first lens L1 and second lens L2 is defined as $D_2=d_2+d_3+d_4$, and the distance $D_4$ between the second lens L2 and third lens L3 is defined as $D_4=d_6$.

Aspheric surface data are illustrated together with the surface numbers in the respective columns of Tables 1 through 6. The surfaces $r_3$ and $r_4$ of the aperture diaphragm S1, the two surfaces $r_9$, $r_{10}$ of the cover glass, and the imaging surface $r_{11}$ are flat, and hence the radius of curvature thereof is displayed as $\infty$.

The aspheric surfaces used in the present invention are obtained according to the following equation.

$$Z = ch^2/[1+[1-(1+k)c^2h^2]^{+1/2}] + A_0h^4 + B_0h^6 + C_0h^8 + D_0h^{10}$$

where

Z is the depth from the tangential plane to the surface apex, c is the paraxial curvature of the surface, h is the height from the optical axis, k is the conic constant, $A_0$ is the quartic aspheric coefficient, $B_0$ is the sextic aspheric coefficient, $C_0$ is the eighth-order ashperic coefficient, and $D_0$ is the tenth-order aspheric coefficient.

Numerical values indicating the aspheric coefficients are displayed as indices in Tables 1 through 6 in this specification. For example, "e-1" signifies "$10^{-1}$". Further, the value illustrated as the focal length f is the combined focal length of the lens system constituted by the first through third lenses.

Embodiments 1 through 6 will now be described with reference to FIGS. 2 through 25. FIGS. 2, 6, 10, 14, 18, and 22 are schematic diagrams showing lens constitutions. FIGS. 3, 7, 11, 15, 19, and 23 show distortion curves, FIGS. 4, 8, 12, 16, 20, and 24 show astigmatism curves, and FIGS. 5, 9, 13, 17, 21, and 25 show chromatic and spherical aberration curves.

The distortion curve shows aberration (the abscissa shows as a percentage the degree to which the tangent condition is unsatisfied) in relation to the distance from the optical axis (the ordinate shows a percentage with the maximum distance from the optical axis on the imaging surface set to 100). Similarly to the distortion curve, the astigmatism curve shows the amount of aberration (in units of mm) in relation to the distance from the optical axis along the abscissa, and shows the amount of aberration (in units of mm) on the meridional plane and the sagittal plane. The chromatic and spherical aberration curve shows the amount of aberration (in units of mm) along the abscissa in relation to the distance of incidence h (F number) along the ordinate.

The chromatic and spherical aberration curve also shows aberration values for the C line (light with a wavelength of 656.3 nm), the d line (light with a wavelength of 587.6 nm), the e line (light with a wavelength of 546.1 nm), the F line (light with a wavelength of 486.1 nm), and the g line (light with a wavelength of 435.8 nm). The refractive index is the refractive index on the d line (587.6 nm light).

The radius of curvature (mm units), lens surface distance (mm units), refractive index of the lens material, Abbe number of the lens material, focal length, numerical aperture, and aspheric coefficient of the lenses used in the Embodiments 1 through 6 are listed below. In the Embodiments 1 through 6, the focal lengths of the first lens L1, second lens L2, and third lens L3 are indicated as $f_1$, $f_2$, and $f_3$ respectively.

TABLE 1

First Embodiment

| Radius of Curvature (ri) | Distance (di) | Refractivity (Ni) | Abbe Number (vi) | Aspheric Coefficient | | | | |
|---|---|---|---|---|---|---|---|---|
| | | | | K | $A_0$ | $B_0$ | $C_0$ | $D_0$ |
| r1 = 0.296 | d1 = 0.2704 | N1 = 1.525 | v1 = 56.2 | 3.005e−1 | −8.640e−1 | 1.398e+1 | −3.892e+2 | 5.465e+3 |
| r2 = 0.720 | d2 = 0.0148 | | | 9.062 | 4.608 | −1.552e+2 | 4.615e+4 | −1.069e+6 |
| r3 = ∞ | d3 = 0.0123 | | | | | | | |
| r4 = ∞ | d4 = 0.0492 | | | 1.593e−1 | 2.511 | 6.815e+2 | −3.653e+4 | 6.896e+5 |
| r5 = −0.310 | d5 = 0.2459 | N5 = 1.525 | v5 = 56.2 | −2.442e−1 | 7.378 | 6.553e+1 | −9.128e+2 | 1.577e+3 |
| r6 = −0.446 | d6 = 0.0369 | | | | | | | |
| r7 = 1.416 | d7 = 0.2007 | N7 = 1.525 | v7 = 56.2 | −1.211 | −1.240e−1 | 5.397e−1 | 3.175e+1 | −3.943e+1 |
| r8 = 1.808 | d8 = 0.0608 | | | −2.361 | −5.596 | 1.749e+1 | −7.991e+1 | 4.312e+2 |
| r9 = ∞ | d9 = 0.1140 | N9 = 1.500 | v9 = 56.0 | | | | | |
| r10 = ∞ | d10 = 0.2280 | | | | | | | |
| r11 = ∞ | | | | | | | | |

Focal Length f = 1.0 mm
Numerical Aperture Fno = 3.4
$f_1$ = 0.79 mm
$f_2$ = −5.14 mm
$f_3$ = 10.56 mm

TABLE 2

Second Embodiment

| Radius of Curvature (ri) | Distance (di) | Refractivity (Ni) | Abbe Number (vi) | Aspheric Coefficient | | | | |
|---|---|---|---|---|---|---|---|---|
| | | | | K | $A_0$ | $B_0$ | $C_0$ | $D_0$ |
| r1 = 0.300 | d1 = 0.2752 | N1 = 1.525 | v1 = 56.2 | 2.936e−1 | −7.636e−1 | 1.153e+1 | −3.543e+2 | 5.309e+3 |
| r2 = 0.748 | d2 = 0.0150 | | | 9.804 | 4.541 | −1.340e+2 | 4.140e+4 | −9.523e+5 |
| r3 = ∞ | d3 = 0.0125 | | | | | | | |
| r4 = ∞ | d4 = 0.0500 | | | 1.070e−1 | 2.635 | 6.477e+2 | −3.272e+4 | 5.628e+5 |
| r5 = −0.315 | d5 = 0.2502 | N5 = 1.525 | v5 = 56.2 | −1.867e−1 | 6.981 | 5.846e+1 | −8.195e+2 | 1.463e+3 |
| r6 = −0.483 | d6 = 0.0232 | | | | | | | |
| r7 = 1.183 | d7 = 0.2158 | N7 = 1.525 | v7 = 56.2 | −1.931 | −1.458e−1 | 2.760e−1 | 2.766e+1 | −3.098e+1 |
| r8 = 1.784 | d8 = 0.0523 | | | −1.517 | −5.334 | 1.586e+1 | −7.114e+1 | 3.705e+2 |
| r9 = ∞ | d9 = 0.1160 | N9 = 1.500 | v9 = 56.0 | | | | | |
| r10 = ∞ | d10 = 0.2322 | | | | | | | |
| r11 = ∞ | | | | | | | | |

Focal Length f = 1.0 mm
Numerical Aperture Fno = 3.4
$f_1$ = 0.79 mm
$f_2$ = −3.57 mm
$f_3$ = 5.96 mm

TABLE 3

Third Embodiment

| Radius of Curvature (ri) | Distance (di) | Refractivity (Ni) | Abbe Number (vi) | Aspheric Coefficient | | | | |
|---|---|---|---|---|---|---|---|---|
| | | | | K | $A_0$ | $B_0$ | $C_0$ | $D_0$ |
| r1 = 0.296 | d1 = 0.2790 | N1 = 1.525 | v1 = 56.2 | 1.085e−1 | 5.752e−1 | −9.986e−1 | 7.337e+1 | 2.948e+3 |
| r2 = 0.738 | d2 = 0.0129 | | | 1.041e+1 | 4.517 | −3.163e+2 | −3.377e+3 | 3.605e+5 |
| r3 = ∞ | d3 = 0.0107 | | | | | | | |
| r4 = ∞ | d4 = 0.0665 | | | 5.540e−1 | 5.756 | −5.728e+2 | 4.876e+4 | −1.973e+6 |
| r5 = −0.257 | d5 = 0.2253 | N5 = 1.525 | v5 = 56.2 | −2.358e−1 | 8.365 | 7.370e−1 | 1.006e+2 | −1.699e+3 |
| r6 = −0.363 | d6 = 0.0215 | | | | | | | |
| r7 = 2.596 | d7 = 0.2682 | N7 = 1.525 | v7 = 56.2 | 2.837e+1 | 8.284e−2 | −8.029e−1 | 3.318 | −2.980e+1 |
| r8 = 5.926 | d8 = 0.0509 | | | 2.513e+1 | −5.310 | 1.391e+1 | −2.237e+1 | 4.114e+1 |
| r9 = ∞ | d9 = 0.1073 | N9 = 1.500 | v9 = 56.0 | | | | | |
| r10 = ∞ | d10 = 0.2146 | | | | | | | |
| r11 = ∞ | | | | | | | | |

Focal Length f = 1.0 mm  
Numerical Aperture Fno = 3.4  
$f_1$ = 0.78 mm  
$f_2$ = −6.27 mm  
$f_3$ = 8.56 mm

TABLE 4

Fourth Embodiment

| Radius of Curvature (ri) | Distance (di) | Refractivity (Ni) | Abbe Number (vi) | Aspheric Coefficient | | | | |
|---|---|---|---|---|---|---|---|---|
| | | | | K | $A_0$ | $B_0$ | $C_0$ | $D_0$ |
| r1 = 0.295 | d1 = 0.2820 | N1 = 1.525 | v1 = 56.2 | 1.154e−1 | 5.139e−1 | −1.710 | 7.632e+1 | 2.940e+3 |
| r2 = 0.724 | d2 = 0.0125 | | | 1.029e+1 | 4.678 | −3.379e+2 | −3.139e+3 | 4.502e+5 |
| r3 = ∞ | d3 = 0.0104 | | | | | | | |
| r4 = ∞ | d4 = 0.0647 | | | 5.483e−1 | 6.432 | −6.597e+2 | 6.007e+4 | −2.437e+6 |
| r5 = −0.256 | d5 = 0.2297 | N5 = 1.525 | v5 = 56.2 | −2.113e−1 | 8.971 | −1.252 | 1.048e+2 | −2.112e+3 |
| r6 = −0.366 | d6 = 0.0209 | | | | | | | |
| r7 = 2.636 | d7 = 0.2506 | N7 = 1.525 | v7 = 56.2 | 3.134e+1 | 1.331e−1 | −4.695e−1 | 4.197 | −4.096e+1 |
| r8 = 9.313 | d8 = 0.0695 | | | 5.570e+1 | −5.629 | 1.633e+1 | −2.746e+1 | 6.040e+1 |
| r9 = ∞ | d9 = 0.1044 | N9 = 1.500 | v9 = 56.0 | | | | | |
| r10 = ∞ | d10 = 0.2090 | | | | | | | |
| r11 = ∞ | | | | | | | | |

Focal Length f = 1.0 mm  
Numerical Aperture Fno = 3.4  
$f_1$ = 0.77 mm  
$f_2$ = −5.72 mm  
$f_3$ = 6.91 mm

TABLE 5

Fifth Embodiment

| Radius of Curvature (ri) | Distance (di) | Refractivity (Ni) | Abbe Number (vi) | Aspheric Coefficient | | | | |
|---|---|---|---|---|---|---|---|---|
| | | | | K | $A_0$ | $B_0$ | $C_0$ | $D_0$ |
| r1 = 0.299 | d1 = 0.2733 | N1 = 1.525 | v1 = 56.2 | 1.493e−1 | 4.282e−1 | 6.175e−1 | −1.305e+1 | 4.431e+3 |
| r2 = 0.748 | d2 = 0.0131 | | | 9.585 | 2.922 | −1.409e+2 | 7.790e+3 | −3.274e+5 |
| r3 = ∞ | d3 = 0.0109 | | | | | | | |
| r4 = ∞ | d4 = 0.0656 | | | 4.477e−1 | 5.388 | −3.525e+2 | 4.469e+4 | −1.992e+6 |
| r5 = −0.262 | d5 = 0.2186 | N5 = 1.525 | v5 = 56.2 | −3.852e−1 | 9.149 | 3.840 | 7.229e+1 | −2.955e+3 |
| r6 = −0.362 | d6 = 0.0219 | | | | | | | |
| r7 = 2.626 | d7 = 0.2733 | N7 = 1.525 | v7 = 56.2 | 2.723e+1 | 4.776e−1 | −2.570 | 6.475 | −3.627e+1 |
| r8 = 4.922 | d8 = 0.0084 | | | −1.491e+2 | −5.198 | 1.266e+1 | −6.554 | −9.668 |
| r9 = ∞ | d9 = 0.1271 | N9 = 1.500 | v9 = 56.0 | | | | | |
| r10 = ∞ | d10 = 0.2542 | | | | | | | |
| r11 = ∞ | | | | | | | | |

Focal Length f = 1.0 mm  
Numerical Aperture Fno = 3.4  
$f_1$ = 0.79 mm  
$f_2$ = −7.42 mm  
$f_3$ = 10.30 mm

TABLE 6

Sixth Embodiment

| Radius of Curvature (ri) | Distance (di) | Refractivity (Ni) | Abbe Number (vi) | Aspheric Coefficient | | | | |
|---|---|---|---|---|---|---|---|---|
| | | | | K | $A_0$ | $B_0$ | $C_0$ | $D_0$ |
| r1 = 0.290 | d1 = 0.2730 | N1 = 1.525 | v1 = 56.2 | 1.784e−1 | −3.272e−1 | 1.338e+1 | −3.702e+2 | 5.659e+3 |
| r2 = 0.777 | d2 = 0.0147 | | | 1.098e+1 | 2.983 | −2.162e+1 | 7.146e+3 | −3.417e+5 |
| r3 = ∞ | d3 = 0.0082 | | | | | | | |
| r4 = ∞ | d4 = 0.0539 | | | 4.747e−1 | 4.033 | −7.681e+2 | 5.775e+4 | −2.042e+6 |
| r5 = −0.330 | d5 = 0.2484 | N5 = 1.583 | v5 = 56.2 | −2.898e−1 | 8.951 | −2.204e+1 | 5.668 | −8.195e+2 |
| r6 = −0.448 | d6 = 0.0360 | | | | | | | |
| r7 = 2.623 | d7 = 0.1969 | N7 = 1.525 | v7 = 56.2 | 2.893e+1 | 5.449e−1 | 9.807e−1 | −9.957 | 1.731 |
| r8 = 1.602 | d8 = 0.0769 | | | −1.498e+1 | −5.362 | 2.138e+1 | −4.449e+1 | 7.215e+1 |
| r9 = ∞ | d9 = 0.0985 | N9 = 1.500 | v9 = 56.0 | | | | | |
| r10 = ∞ | d10 = 0.1969 | | | | | | | |
| r11 = ∞ | | | | | | | | |

Focal Length f = 1.0 mm
Numerical Aperture Fno = 3.4
$f_1$ = 0.74 mm
$f_2$ = −9.52 mm
$f_3$ = −8.39 mm The features of the lenses used in each of the embodiments are described below. In the Embodiments 1 through 5, ZEONEX 480R ("ZEONEX" is a registered trademark of Zeon Corporation, and 480R is the series number), which is cycloolefin plastics, is used as the material for the first lens L1, second lens L2, and third lens L3. In the Embodiment 6, polycarbonate is used instead of ZEONEX 480R as the material for the second lens L2.

The refractivity on the d line of ZEONEX 480R is 1.525, and the refractivity on the d line of polycarbonate is 1.583. The Abbe number of ZEONEX 480R is 56.2, and the Abbe number of polycarbonate is 30.0.

Both surfaces of the first lens L1, second lens L2, and third lens L3 respectively are aspheric surfaces. Hence in each of the Embodiments and comparative examples, the number of aspheric surfaces is six, and thus the condition that at least one surface of the third lens L3 be an aspheric surface is satisfied.

It was learned through simulation that if the Abbe number of the material of the lenses is within a range of thirty to sixty, substantially no discrepancies appear in lens performance qualities such as aberration. In other words, it was learned that as long as the Abbe number is a value within this range, the object of the present invention, i.e. the favorable correction of various aberrations in an imaging lens in comparison to aberration correction in a conventional imaging lens, can be realized.

A cover glass 12 which also serves as an infrared cut filter is inserted between the lens system and the imaging surface in each of Embodiments 1 through 6. Glass (with a refractive index on the d line of 1.50) is used as the material for this filter. The various aberrations to be described below are calculated on the premise that the filter is present. The focal length of the entire imaging lens system disclosed in the following Embodiments 1 through 6, or in other words the combined focal length f, is set to 1.0 mm.

Embodiment 1

(A) The object-side radius of curvature $r_1$ of the first lens L1 is $r_1$=0.296 mm.
(B) The image-side radius of curvature $r_2$ of the first lens L1 is $r_2$=0.720 mm.
(C) The back focus $b_f$ is $b_f$=0.365 mm.
(D) The distance through the atmosphere from the object-side surface of the first lens L1 to the imaging surface, or in other words the optical length d, is $d=d_1+d_2+d_3+d_4+d_5+d_6+d_7+b_f$=1.195 mm.
(E) The distance $D_2$ between the first lens L1 and second lens L2 is $D_2=d_2+d_3+d_4$=0.076 mm.
(F) The distance $D_4$ between the second lens L2 and third lens L3 is $D_4=d_6$=0.0369 mm.
(G) The focal length $f_1$ of the first lens L1 is $f_1$=0.79 mm.
(H) The focal length $f_2$ of the second lens L2 is $f_2$=−5.14 mm.
(I) The focal length $f_3$ of the third lens L3 is $f_3$=10.56 mm.
Hence
(1) $r_1/r_2$ =0.296/0.720=0.4111
(2) $D_2/f$=0.076/1.00=0.076
(3) $D_4/f$0.0369/1.00=0.0369
(4) $d/f$=1.195/1.00=1.195, and
(5) $b_f/f$=0.365/1.00=0.365.

Thus the lens system of the Embodiment 1 satisfies all of the following conditional expressions (1) through (5).

$$0.35 < r_1/r_2 < 0.45 \quad (1)$$

$$0.07 < D_2/f < 0.1 \quad (2)$$

$$0.01 < D_4/f < 0.04 \quad (3)$$

$$1.00 < d/f < 1.30 \quad (4)$$

$$0.3 < b_f/f < 0.5 \quad (5)$$

Hereafter, the term "conditional expressions" will be used to indicate these five expressions (1) through (5).

As shown in Table 1, the aperture diaphragm S1 is provided in a position 0.0148 mm ($d_2$=0.0148 mm) rearward of the second surface (the image-side surface) of the first lens L1. The numerical aperture (F number) is 3.4.

Figure 2:
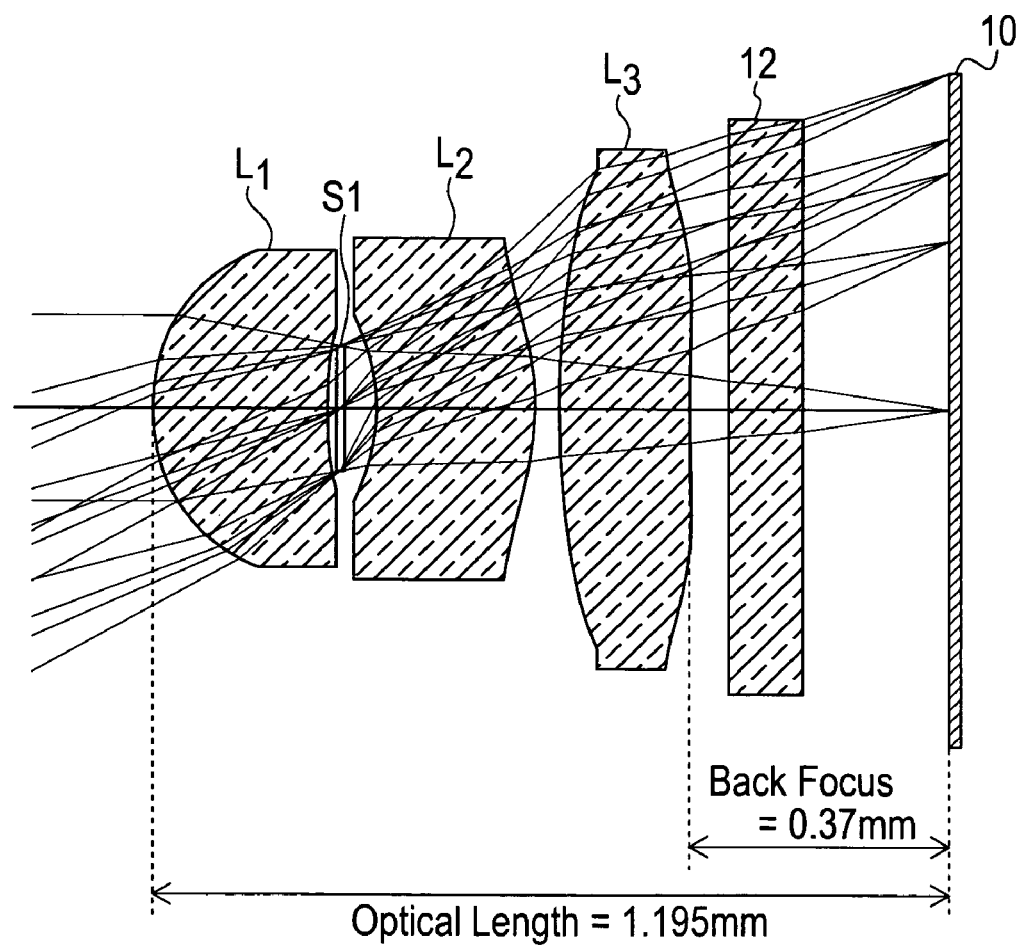
FIG. 2 is a sectional view of an imaging lens of Embodiment 1.

A sectional view of the imaging lens of the Embodiment 1 is shown in FIG. 2. The back focus in relation to a focal length of 1.00 mm is 0.365 mm, and hence a sufficient length is secured.

Figure 3:
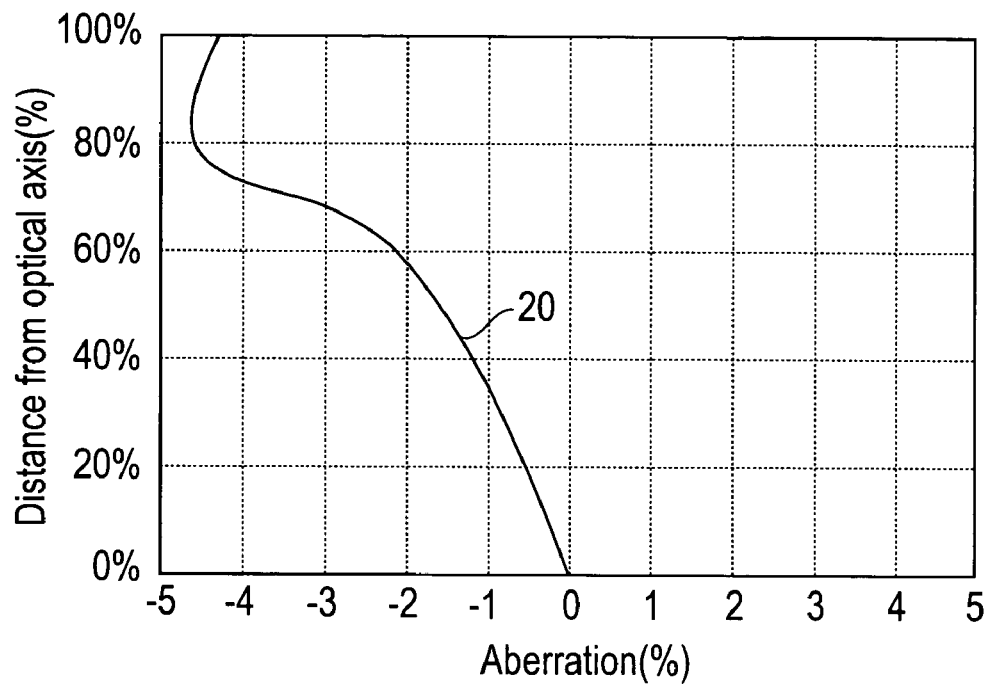
FIG. 3 is a view of distortion in the imaging lens of the Embodiment 1.
Figure 4:
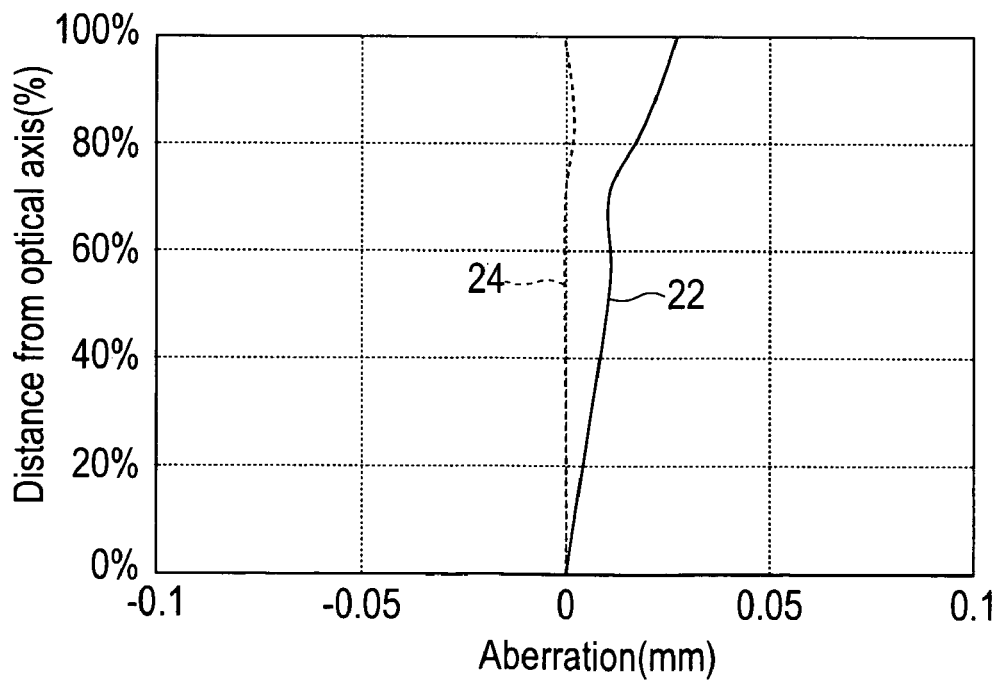
FIG. 4 is a view of astigmatism in the imaging lens of the Embodiment 1.
Figure 5:
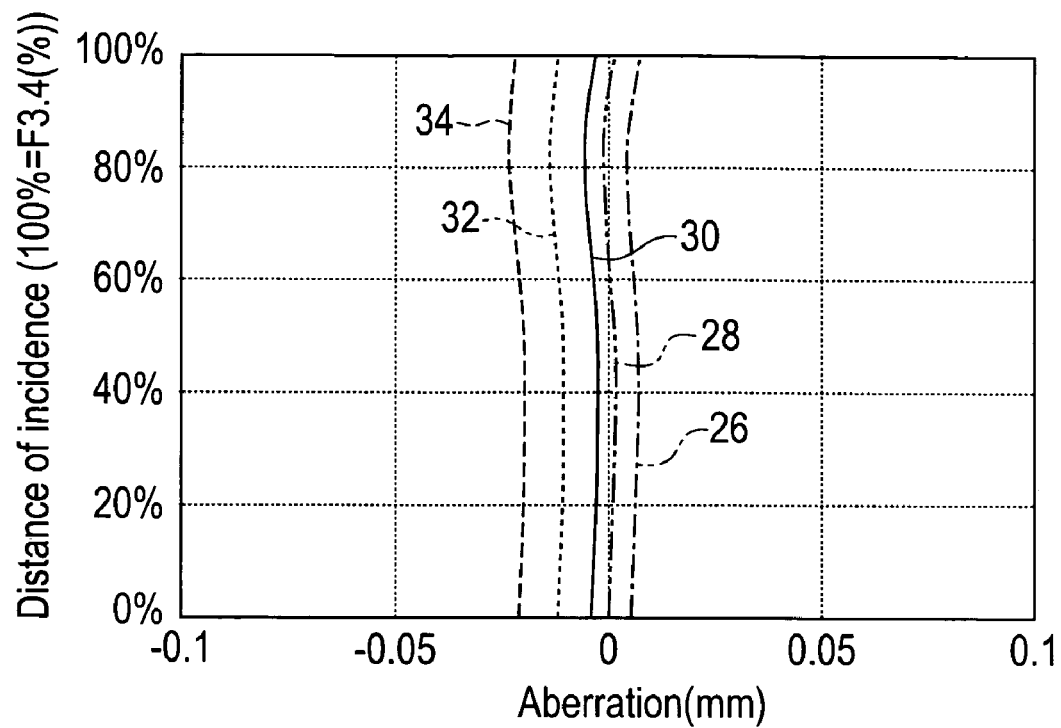
FIG. 5 is a view of chromatic and spherical aberration in the imaging lens of the Embodiment 1.

The distortion curve 20 shown in FIG. 3, the astigmatism curve (the aberration curve 22 relating to the meridional plane and the aberration curve 24 relating to the sagittal plane) shown in FIG. 4, and the chromatic and spherical aberration curve (the aberration curve 26 relating to the C line, the aberration curve 28 relating to the d line, the aberration curve 30 relating to the e line, the aberration curve 32 relating to the F line, and the aberration curve 34 relating to the g line) shown in FIG. 5 are respectively illustrated by graphs.

The ordinate of the aberration curves in FIGS. 3 and 4 illustrate the image height as a percentage of the distance from the optical axis. In FIGS. 3 and 4, 100%, 80%, 70%, and 60% correspond to 0.534 mm, 0.427 mm, 0.374 mm, and 0.320 mm respectively. The ordinate of the aberration curve in FIG. 5 indicates the distance of incidence h (F number), corresponding at its maximum to F3.4. The abscissa in FIG. 5 shows the magnitude of the aberration.

As regards distortion, the absolute value of the amount of aberration reaches a maximum of 4.5919% in an image height position of 80% (image height 0.427 mm), and hence within a range of image height 0.534 mm and below, the absolute value of the aberration amount is held within 4.5919%.

As for astigmatism, the absolute value of the aberration amount on the meridional plane reaches a maximum of 0.0273 mm in an image height position of 100% (image height 0.534 mm), and hence within a range of image height 0.534 mm and below, the absolute value of the aberration amount is held within 0.0273 mm.

As for chromatic and spherical aberration, the absolute value of the aberration curve 34 relating to the g line reaches a maximum of 0.0235 mm at a distance of incidence h of 85%, and hence the absolute value of the aberration amount is held within 0.0235 mm.

Embodiment 2

(A) The object-side radius of curvature $r_1$ of the first lens L1 is $r_1$=0.300 mm.
(B) The image-side radius of curvature $r_2$ of the first lens L1 is $r_2$=0.748 mm.
(C) The back focus $b_f$ is $b_f$=0.362 mm.
(D) The distance through the atmosphere from the object-side surface of the first lens L1 to the imaging surface, or in other words the optical length d, is $d=d_1+d_2+d_3+d_4+d_5+d_6+d_7+b_f$=1.204 mm.
(E) The distance $D_2$ between the first lens L1 and second lens L2 is $D_2=d_2+d_3+d_4$=0.078 mm.
(F) The distance $D_4$ between the second lens L2 and third lens L3 is $D_4=d_6$=0.0232 mm.
(G) The focal length $f_1$ of the first lens L1 is $f_1$=0.79 mm.
(H) The focal length $f_2$ of the second lens L2 is $f_2$=−3.57 mm.
(I) The focal length $f_3$ of the third lens L3 is $f_3$=5.96 mm.
Hence
(1) $r_1/r_2$=0.300/0.748=0.4011
(2) $D_2/f$=0.078/1.00=0.078
(3) $D_4/f$=0.0232/1.00=0.0232
(4) d/f=1.204/1.00=1.204, and
(5) $b_f/f$=0.362/1.00=0.362.

Thus the lens system of the Embodiment 2 satisfies the conditional expressions.

As shown in Table 2, the aperture diaphragm S1 is provided in a position 0.015 mm ($d_2$=0.015 mm) rearward of the second surface (the image-side surface) of the first lens L1. The numerical aperture (F number) is 3.4.

Figure 6:
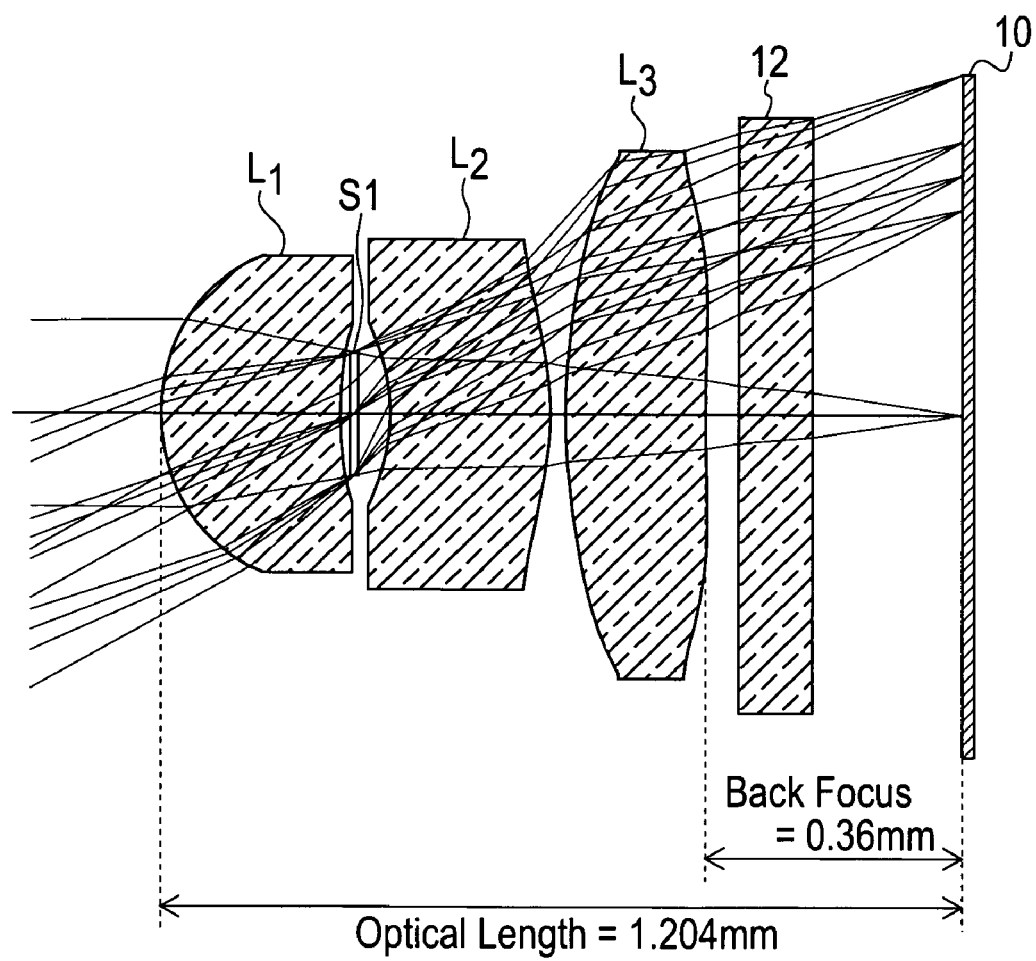
FIG. 6 is a sectional view of an imaging lens of Embodiment 2.

A sectional view of the imaging lens of the Embodiment is shown in FIG. 6. The back focus in relation to a focal length of 1.00 mm is 0.362 mm, and hence a sufficient length is secured.

Figure 7:
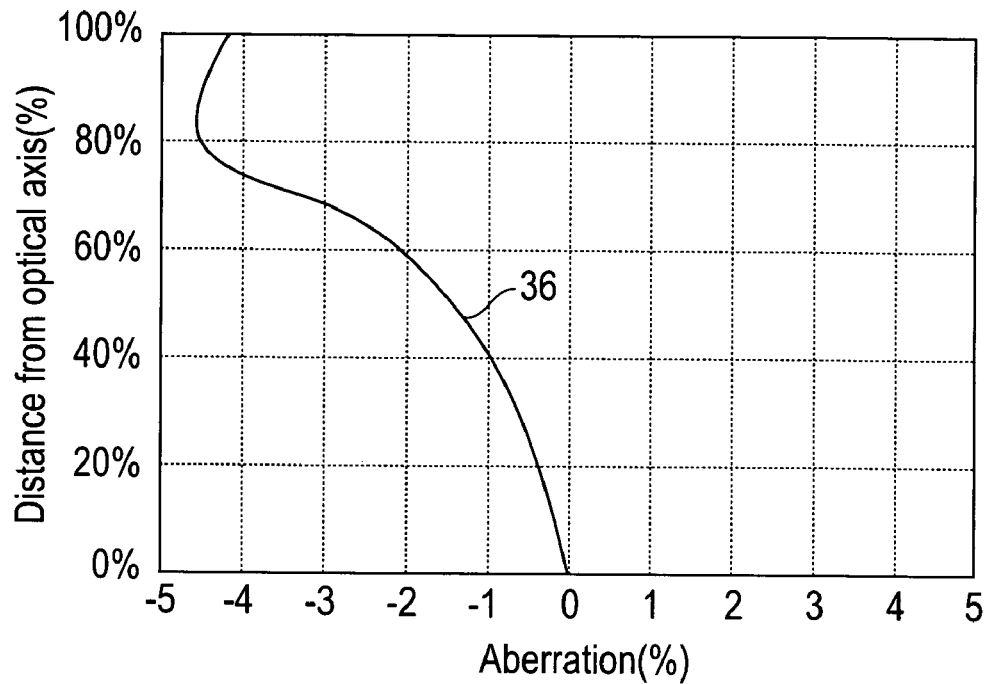
FIG. 7 is a view of distortion in the imaging lens of the Embodiment 2.
Figure 8:
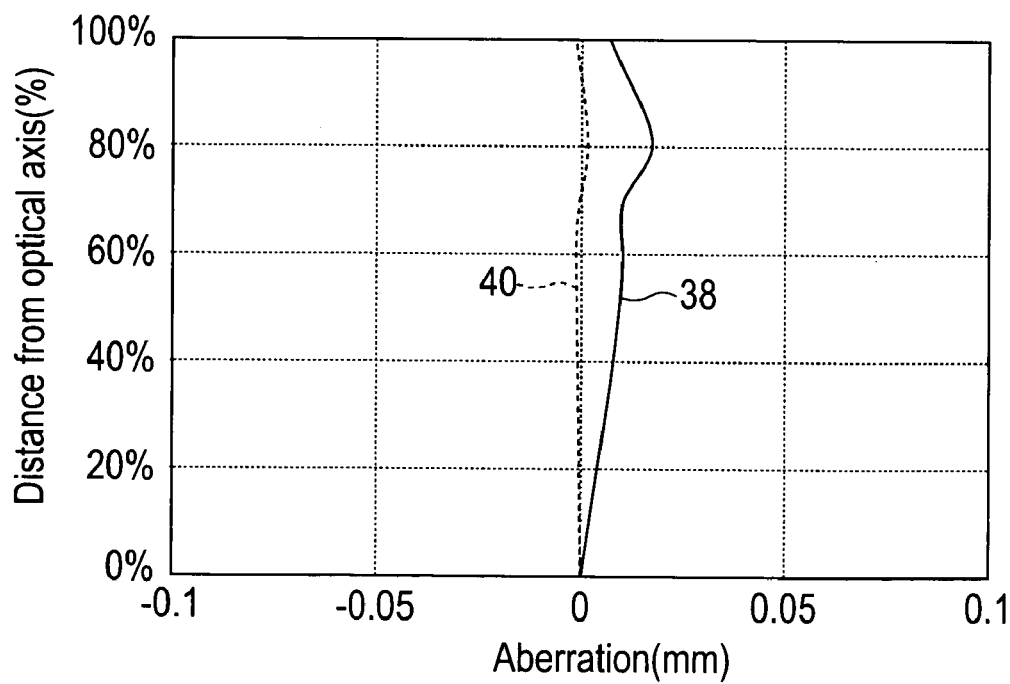
FIG. 8 is a view of astigmatism in the imaging lens of the Embodiment 2.
Figure 9:
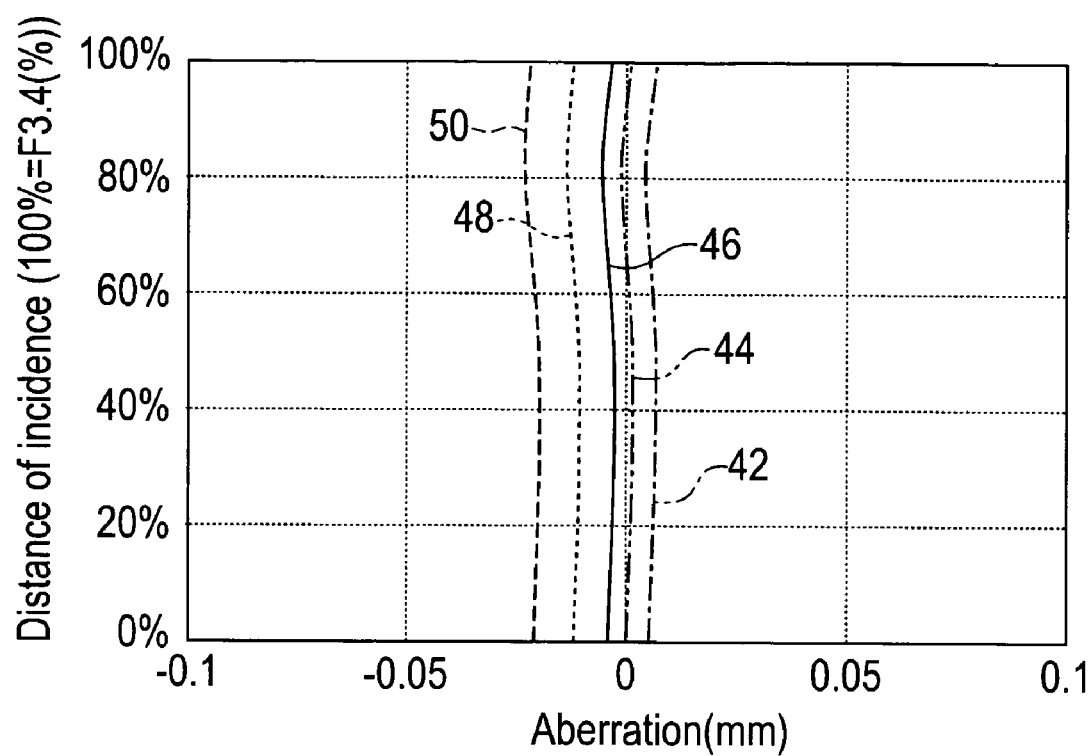
FIG. 9 is a view of chromatic and spherical aberration in the imaging lens of the Embodiment 2.

The distortion curve 36 shown in FIG. 7, the astigmatism curve (the aberration curve 38 relating to the meridional plane and the aberration curve 40 relating to the sagittal plane) shown in FIG. 8, and the chromatic and spherical aberration curve (the aberration curve 42 relating to the C line, the aberration curve 44 relating to the d line, the aberration curve 46 relating to the e line, the aberration curve 48 relating to the F line, and the aberration curve 50 relating to the g line) shown in FIG. 9 are respectively illustrated by graphs.

The ordinate of the aberration curves in FIGS. 7 and 8 illustrate the image height as a percentage of the distance from the optical axis. In FIGS. 7 and 8, 100%, 80%, 70%, and 60% correspond to 0.543 mm, 0.434 mm, 0.380 mm, and 0.326 mm respectively. The ordinate of the aberration curve in FIG. 9 indicates the distance of incidence h (F number), corresponding at its maximum to F3.4. The abscissa in FIG. 9 shows the magnitude of the aberration.

As regards distortion, the absolute value of the amount of aberration reaches a maximum of 4.526% in an image height position of 80% (image height 0.434 mm), and hence within a range of image height 0.543 mm and below, the absolute value of the aberration amount is held within 4.526%.

As for astigmatism, the absolute value of the aberration amount on the meridional plane reaches a maximum of 0.0175 mm in an image height position of 80% (image height 0.434 mm), and hence within a range of image height 0.543 mm and below, the absolute value of the aberration amount is held within 0.0175 mm.

As for chromatic and spherical aberration, the absolute value of the aberration curve 50 relating to the g line reaches a maximum of 0.0230 mm at a distance of incidence h of 85%, and hence the absolute value of the aberration amount is held within 0.0230 mm.

Embodiment 3

(A) The object-side radius of curvature $r_1$ of the first lens L1 is $r_1$=0.296 mm.
(B) The image-side radius of curvature $r_2$ of the first lens L1 is $r_2$=0.738 mm.
(C) The back focus $b_f$ is $b_f$=0.337 mm.
(D) The distance through the atmosphere from the object-side surface of the first lens L1 to the imaging surface, or in other words the optical length d, is $d=d_1+d_2+d_3+d_4+d_5+d_6+d_7+b_f$=1.221 mm.
(E) The distance $D_2$ between the first lens L1 and second lens L2 is $D_2=d_2+d_3+d_4$=0.09 mm.
(F) The distance $D_4$ between the second lens L2 and third lens L3 is $D_4=d_6$=0.0215 mm.
(G) The focal length $f_1$ of the first lens L1 is $f_1$=0.78 mm.
(H) The focal length $f_2$ of the second lens L2 is $f_2$=−6.27 mm.
(I) The focal length $f_3$ of the third lens L3 is $f_3$=8.56 mm.
Hence
(1) $r_1/r_2$ 0.296/0.738=0.4011
(2) $D_2/f$=0.09/1.00=0.09
(3) $D_4/f$=0.0215/1.00=0.0215
(4) d/f=1.221/1.00=1.221, and
(5) $b_f/f$=0.337/1.00=0.337.

Thus the lens system of the Embodiment 3 satisfies the conditional expressions.

As shown in Table 3, the aperture diaphragm S1 is provided in a position 0.0129 mm ($d_2$=0.0129 mm) rearward of the second surface (the image-side surface) of the first lens L1. The numerical aperture (F number) is 3.4.

Figure 10:
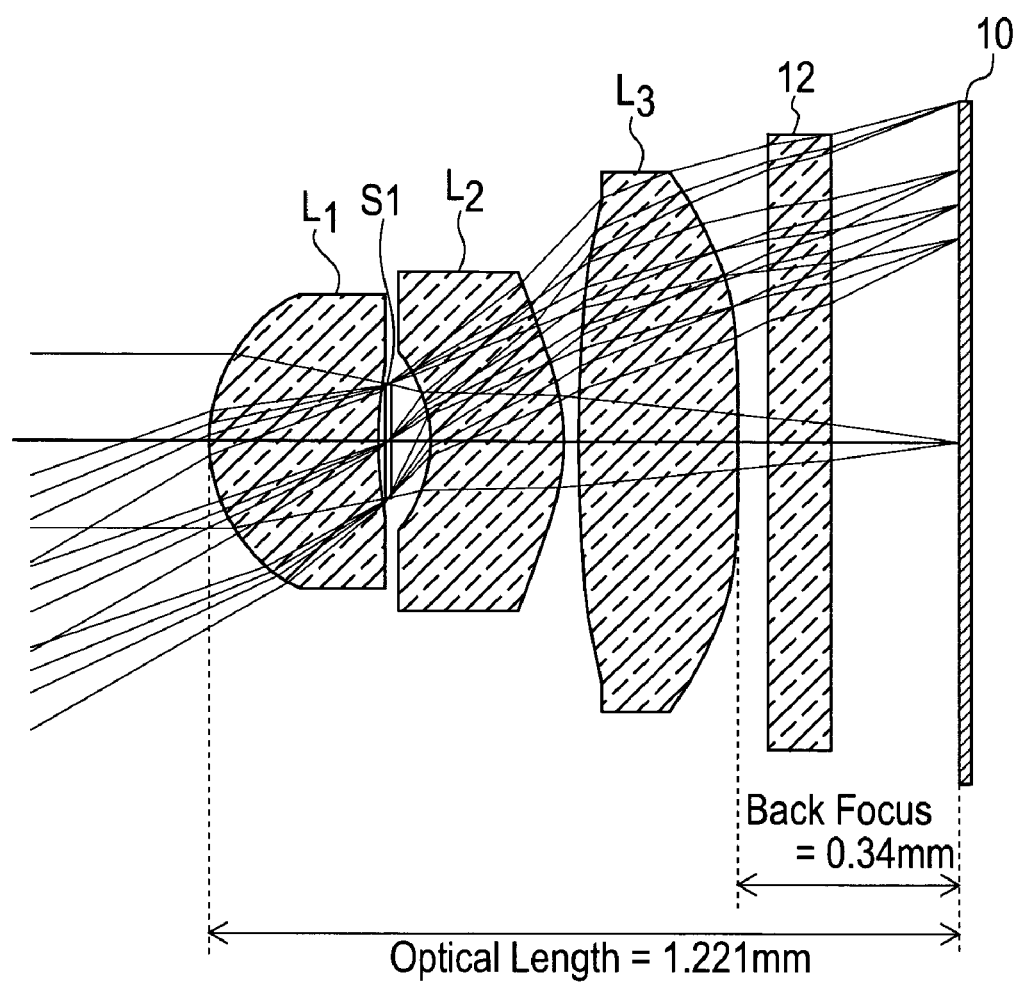
FIG. 10 is a sectional view of an imaging lens of Embodiment 3.

A sectional view of the imaging lens of the Embodiment 3 is shown in FIG. 10. The back focus in relation to a focal length of 1.00 mm is 0.337 mm, and hence a sufficient length is secured.

Figure 11:
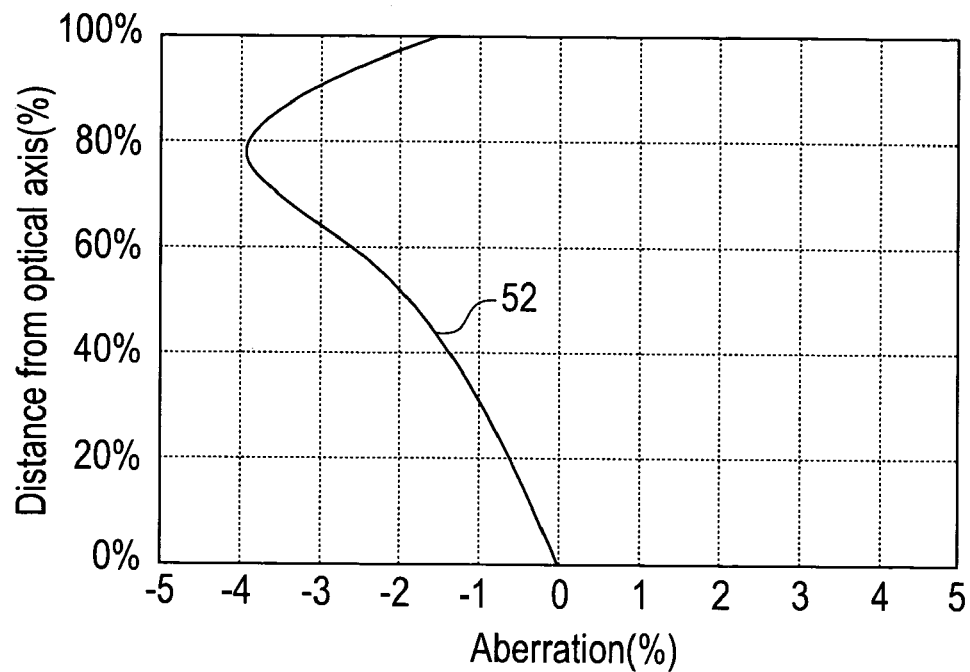
FIG. 11 is a view of distortion in the imaging lens of the Embodiment 3.
Figure 12:
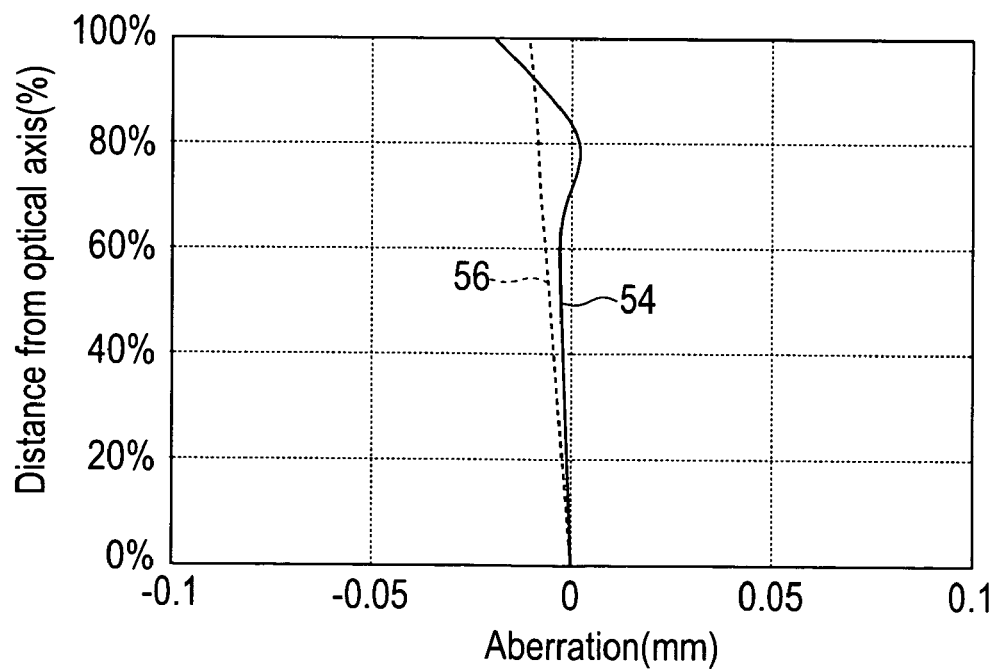
FIG. 12 is a view of astigmatism in the imaging lens of the Embodiment 3.
Figure 13:
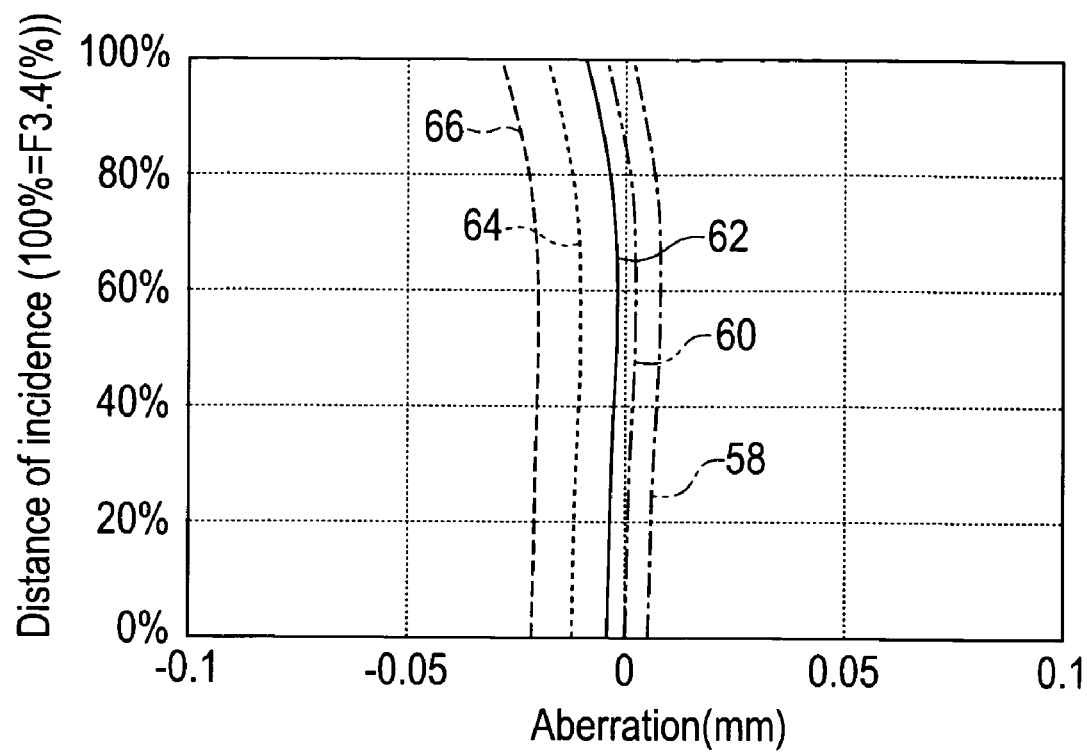
FIG. 13 is a view of chromatic and spherical aberration in the imaging lens of the Embodiment 3.

The distortion curve 52 shown in FIG. 11, the astigmatism curve (the aberration curve 54 relating to the meridional plane and the aberration curve 56 relating to the sagittal plane) shown in FIG. 12, and the chromatic and spherical aberration curve (the aberration curve 58 relating to the C line, the aberration curve 60 relating to the d line, the aberration curve 62 relating to the e line, the aberration curve 64 relating to the F line, and the aberration curve 66 relating to the g line) shown in FIG. 13 are respectively illustrated by graphs.

The ordinate of the aberration curves in FIGS. 11 and 12 illustrate the image height as a percentage of the distance from the optical axis. In FIGS. 11 and 12, 100%, 80%, 70%, and 60% correspond to 0.580 mm, 0.464 mm, 0.406 mm, and 0.348 mm respectively. The ordinate in the aberration curve of FIG. 13 indicates the distance of incidence h (F number), corresponding at its maximum to F3.4. The abscissa in FIG. 13 shows the magnitude of the aberration.

As regards distortion, the absolute value of the amount of aberration reaches a maximum of 3.8995% in an image height position of 80% (image height 0.464 mm), and hence within a range of image height 0.580 mm and below, the absolute value of the aberration amount is held within 3.8995%.

As for astigmatism, the absolute value of the aberration amount on the meridional plane reaches a maximum of 0.0192 mm in an image height position of 100% (image height 0.580 mm), and hence within a range of image height 0.580 mm and below, the absolute value of the aberration amount is held within 0.0192 mm.

As for chromatic and spherical aberration, the absolute value of the aberration curve 66 relating to the g line reaches a maximum of 0.0284 mm at a distance of incidence h of 100%, and hence the absolute value of the aberration amount is held within 0.0284 mm.

Embodiment 4

(A) The object-side radius of curvature $r_1$ of the first lens L1 is $r_1$=0.295 mm.
(B) The image-side radius of curvature $r_2$ of the first lens L1 is $r_2$=0.724 mm.
(C) The back focus $b_f$ is $b_f$=0.348 mm.
(D) The distance through the atmosphere from the object-side surface of the first lens L1 to the imaging surface, or in other words the optical length d, is $d=d_1+d_2+d_3+d_4+d_5+d_6+d_7+b_f$=1.219 mm.
(E) The distance $D_2$ between the first lens L1 and second lens L2 is $D_2=d_2+d_3+d_4$=0.088 mm.
(F) The distance $D_4$ between the second lens L2 and third lens L3 is $D_4=d_6$=0.0209 mm.
(G) The focal length $f_1$ of the first lens L1 is $f_1$=0.77 mm.
(H) The focal length $f_2$ of the second lens L2 is $f_2$=−5.72 mm.
(I) The focal length $f_3$ of the third lens L3 is $f_3$=6.91 mm.
Hence
(1) $r_1/r_2$=0.295/0.724=0.4075
(2) $D_2/f$=0.088/1.00=0.088
(3) $D_4/f$=0.0209/1.00=0.0209
(4) $d/f$=1.219/1.00=1.219, and
(5) $b_f/f$=0.348/1.00=0.348.

Thus the lens system of the Embodiment 4 satisfies the conditional expressions.

As shown in Table 4, the aperture diaphragm S1 is provided in a position 0.0125 mm ($d_2$=0.0125 mm) rearward of the second surface (the image-side surface) of the first lens L1. The numerical aperture (F number) is 3.4.

Figure 14:
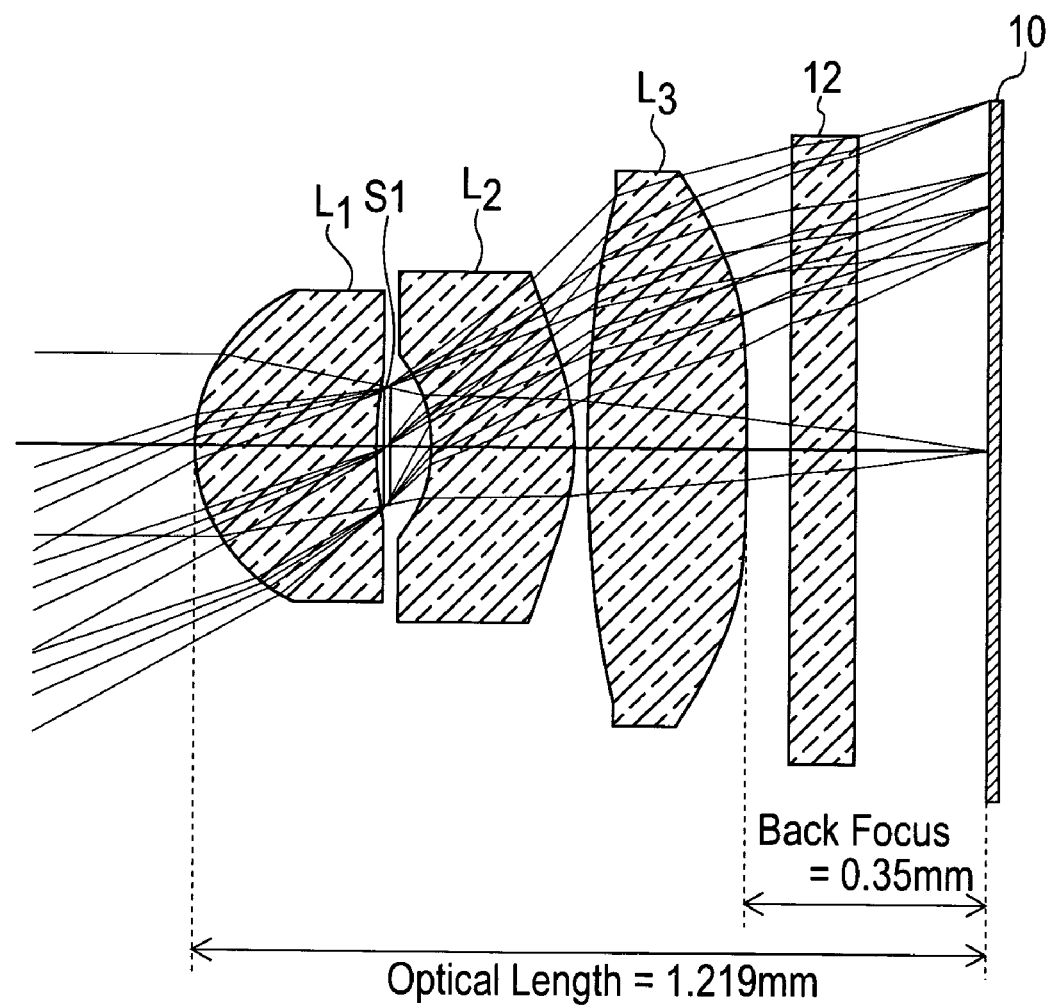
FIG. 14 is a sectional view of an imaging lens of Embodiment 4.

A sectional view of the imaging lens of the Embodiment 4 is shown in FIG. 14. The back focus in relation to a focal length of 1.00 mm is 0.348 mm, and hence a sufficient length is secured.

Figure 15:
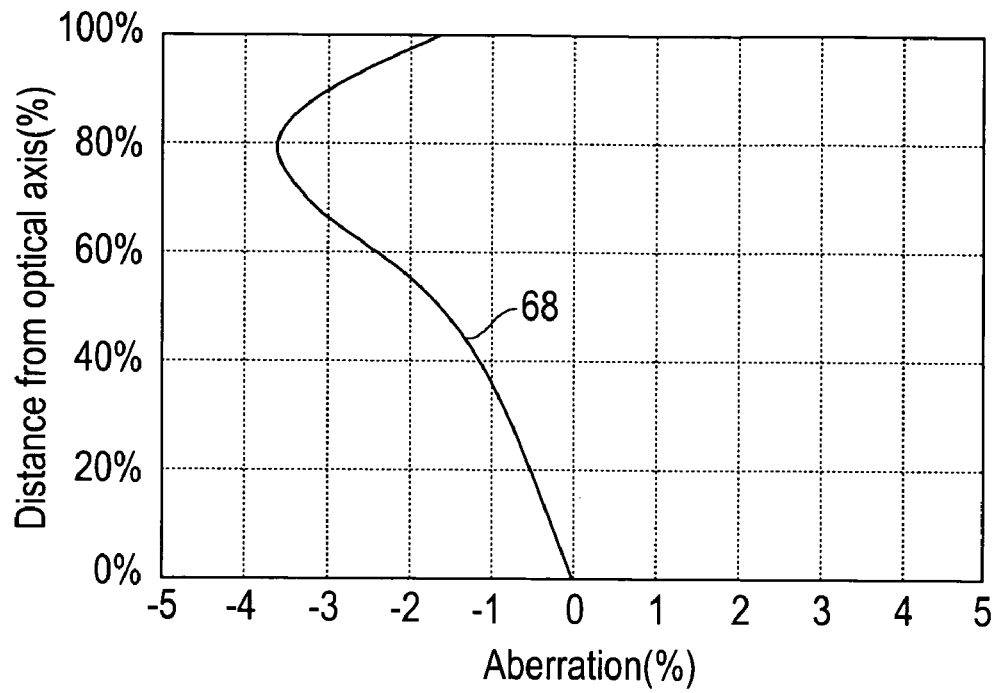
FIG. 15 is a view of distortion in the imaging lens of the Embodiment 4.
Figure 16:
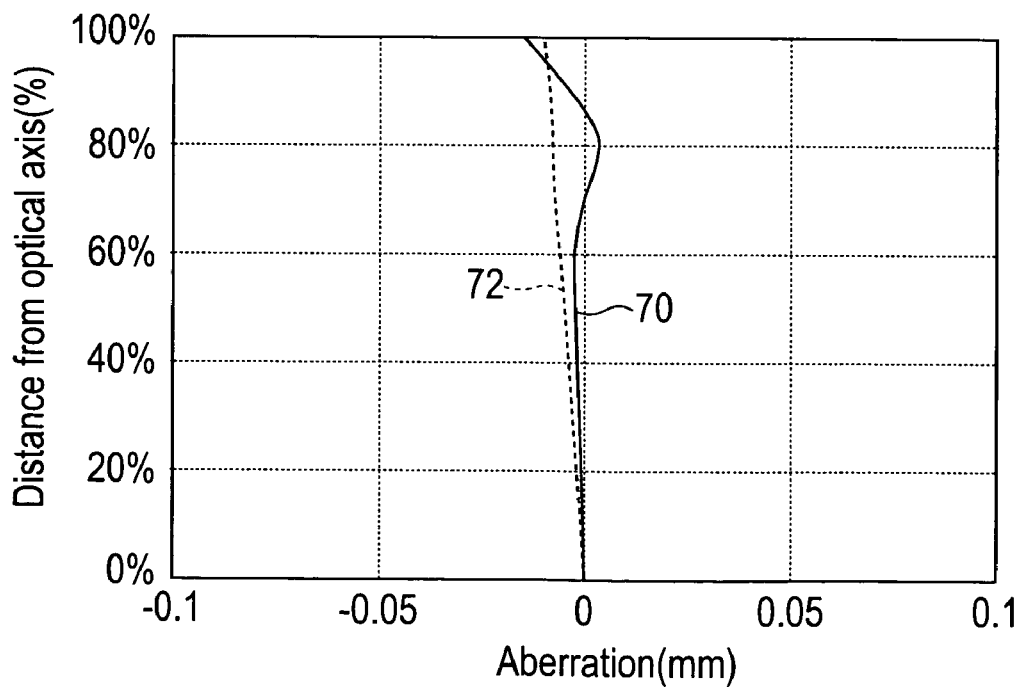
FIG. 16 is a view of astigmatism in the imaging lens of the Embodiment 4.
Figure 17:
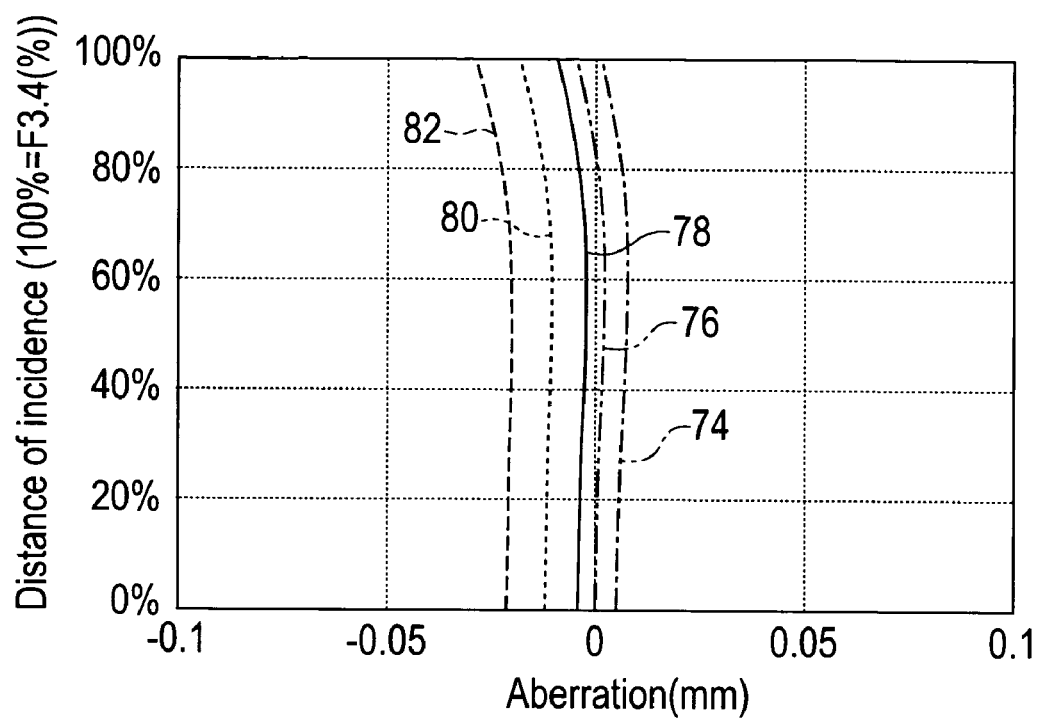
FIG. 17 is a view of chromatic and spherical aberration in the imaging lens of the Embodiment 4.

The distortion curve 68 shown in FIG. 15, the astigmatism curve (the aberration curve 70 relating to the meridional plane and the aberration curve 72 relating to the sagittal plane) shown in FIG. 16, and the chromatic and spherical aberration curve (the aberration curve 74 relating to the C line, the aberration curve 76 relating to the d line, the aberration curve 78 relating to the e line, the aberration curve 80 relating to the F line, and the aberration curve 82 relating to the g line) shown in FIG. 17 are respectively illustrated by graphs.

The ordinate of the aberration curves in FIGS. 15 and 16 illustrate the image height as a percentage of the distance from the optical axis. In FIGS. 15 and 16, 100%, 80%, 70%, and 60% correspond to 0.564 mm, 0.451 mm, 0.395 mm, and 0.338 mm respectively. The ordinate of the aberration curve in FIG. 17 indicates the distance of incidence h (F number), corresponding at its maximum to F3.4. The abscissa in FIG. 17 shows the magnitude of the aberration.

As regards distortion, the absolute value of the amount of aberration reaches a maximum of 3.6086% in an image height position of 80% (image height 0.451 mm), and hence within a range of image height 0.564 mm and below, the absolute value of the aberration amount is held within 3.6086%.

As for astigmatism, the absolute value of the aberration amount on the meridional plane reaches a maximum of 0.0148 mm in an image height position of 100% (image height 0.564 mm), and hence within a range of image height 0.564 mm and below, the absolute value of the aberration amount is held within 0.0148 mm.

As for chromatic and spherical aberration, the absolute value of the aberration curve 82 relating to the g line reaches a maximum of 0.0289 mm at a distance of incidence h of 100%, and hence the absolute value of the aberration amount is held within 0.0289 mm.

Embodiment 5

(A) The object-side radius of curvature $r_1$ of the first lens L1 is $r_1$=0.299 mm.
(B) The image-side radius of curvature $r_2$ of the first lens L1 is $r_2$=0.748 mm.
(C) The back focus $b_f$ is $b_f$=0.347 mm.
(D) The distance through the atmosphere from the object-side surface of the first lens L1 to the imaging surface, or in other words the optical length d, is $d=d_1+d_2+d_3+d_4+d_5+d_6+d_7+b_f$=1.224 mm.
(E) The distance $D_2$ between the first lens L1 and second lens L2 is $D_2=d_2+d_3+d_4$=0.0896 mm.
(F) The distance $D_4$ between the second lens L2 and third lens L3 is $D_4=d_6$=0.0219 mm.
(G) The focal length $f_1$ of the first lens L1 is $f_1$=0.79 mm.
(H) The focal length $f_2$ of the second lens L2 is $f_2$=−7.42 mm.
(I) The focal length $f_3$ of the third lens L3 is $f_3$=10.30 mm.
Hence
(1) $r_1/r_2$=0.299/0.748=0.3997
(2) $D_2/f$=0.0896/1.00=0.0896
(3) $D_4/f$=0.0219/1.00=0.0219

(4) d/f=1.224/1.00=1.224, and
(5) $b_f$/f=0.347/1.00=0.347.

Thus the lens system of the Embodiment 5 satisfies the conditional expressions.

As shown in Table 5, the aperture diaphragm S1 is provided in a position 0.0131 mm ($d_2$=0.0131 mm) rearward of the second surface (the image-side surface) of the first lens L1. The numerical aperture (F number) is 3.4.

Figure 18:
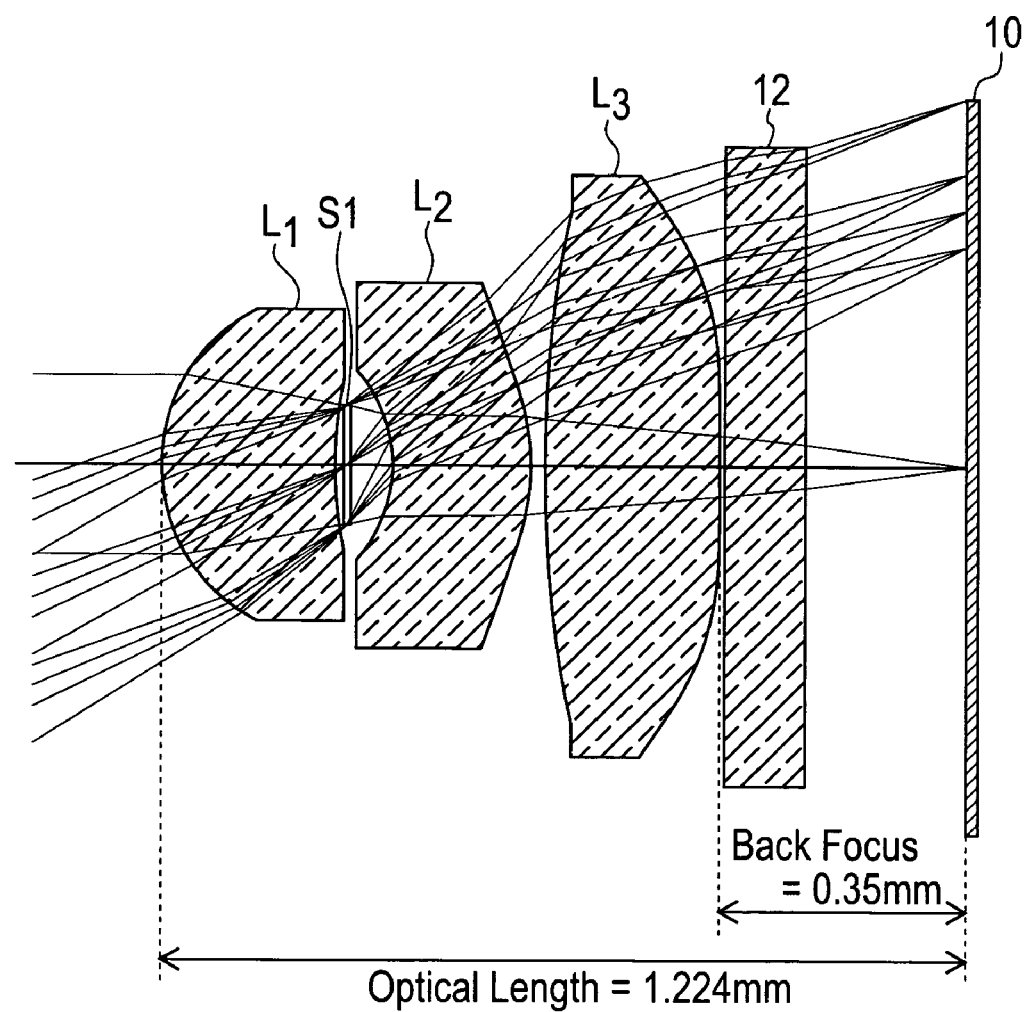
FIG. 18 is a sectional view of an imaging lens of Embodiment 5.

A sectional view of the imaging lens of the Embodiment 5 is shown in FIG. 18. The back focus in relation to a focal length of 1.00 mm is 0.347 mm, and hence a sufficient length is secured.

Figure 19:
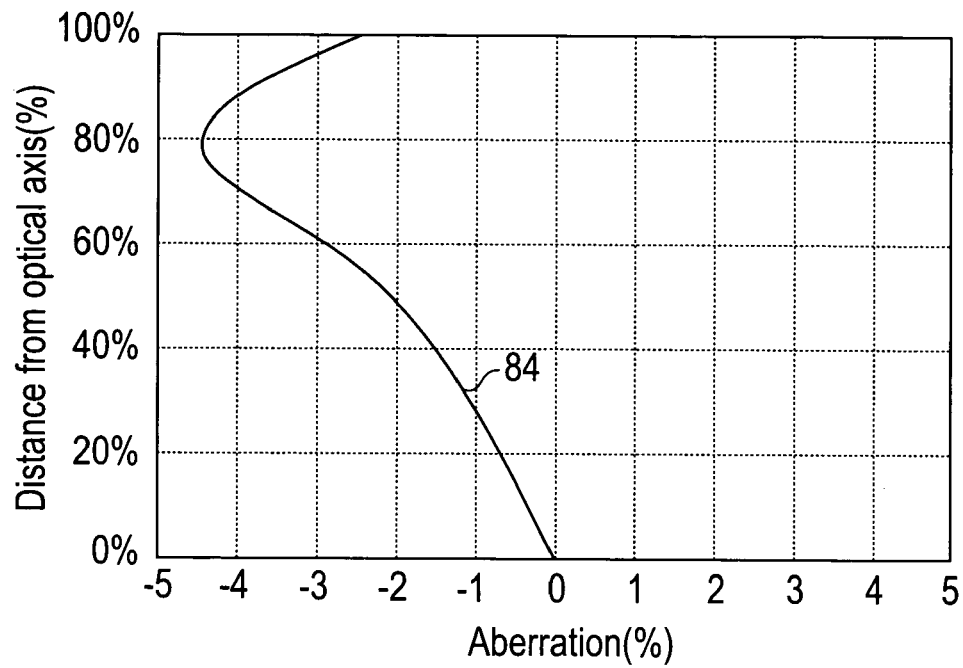
FIG. 19 is a view of distortion in the imaging lens of the Embodiment 5.
Figure 20:
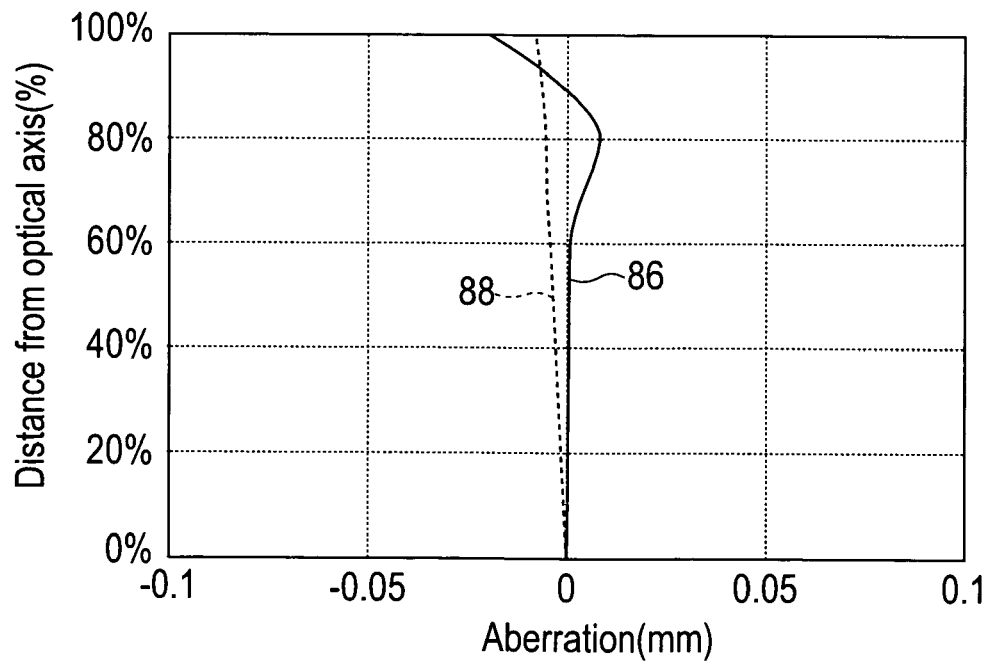
FIG. 20 is a view of astigmatism in the imaging lens of the Embodiment 5.
Figure 21:
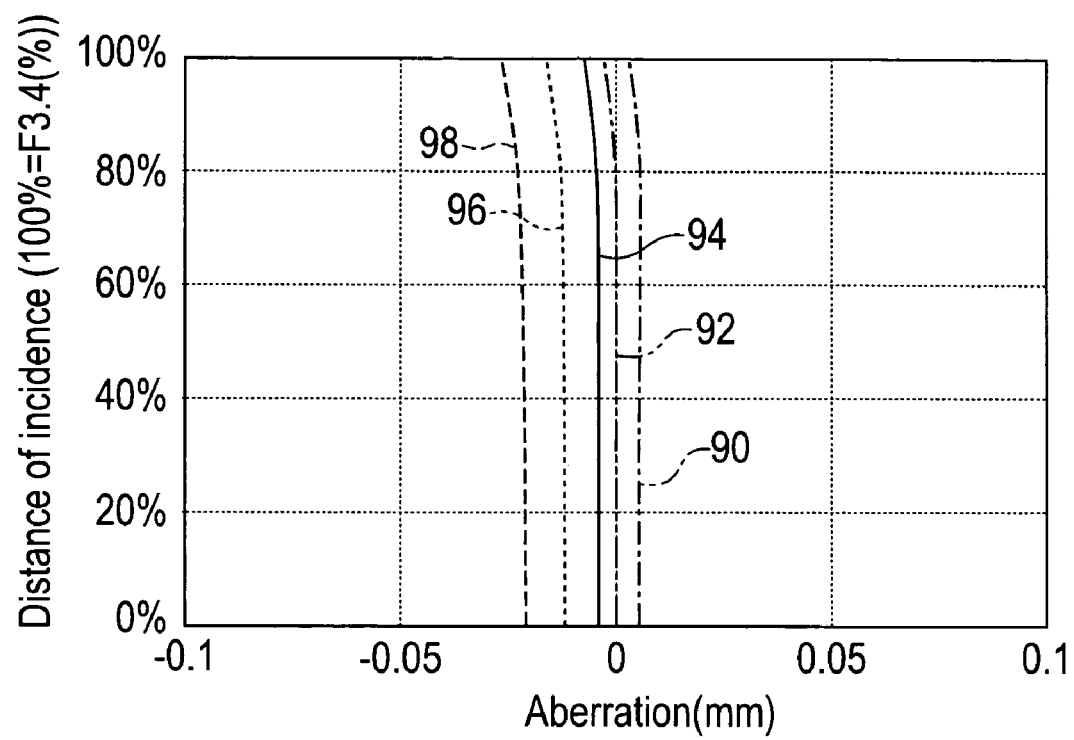
FIG. 21 is a view of chromatic and spherical aberration in the imaging lens of the Embodiment 5.

The distortion curve 84 shown in FIG. 19, the astigmatism curve (the aberration curve 86 relating to the meridional plane and the aberration curve 88 relating to the sagittal plane) shown in FIG. 20, and the chromatic and spherical aberration curve (the aberration curve 90 relating to the C line, the aberration curve 92 relating to the d line, the aberration curve 94 relating to the e line, the aberration curve 96 relating to the F line, and the aberration curve 98 relating to the g line) shown in FIG. 21 are respectively illustrated by graphs.

The ordinate of the aberration curves in FIGS. 19 and 20 illustrate the image height as a percentage of the distance from the optical axis. In FIGS. 19 and 20, 100%, 80%, 70%, and 60% correspond to 0.585 mm, 0.468 mm, 0.409 mm, and 0.351 mm respectively. The ordinate of the aberration curve in FIG. 21 indicates the distance of incidence h (F number), corresponding at its maximum to F3.4. The abscissa in FIG. 21 shows the magnitude of the aberration.

As regards distortion, the absolute value of the amount of aberration reaches a maximum of 4.4431% in an image height position of 80% (image height 0.468 mm), and hence within a range of image height 0.585 mm and below, the absolute value of the aberration amount is held within 4.4431%.

As for astigmatism, the absolute value of the aberration amount on the meridional plane reaches a maximum of 0.0195 mm in an image height position of 100% (image height 0.585 mm), and hence within a range of image height 0.585 mm and below, the absolute value of the aberration amount is held within 0.0195 mm.

As for chromatic and spherical aberration, the absolute value of the aberration curve 98 relating to the g line reaches a maximum of 0.0266 mm at a distance of incidence h of 100%, and hence the absolute value of the aberration amount is held within 0.0266 mm.

Embodiment 6

(A) The object-side radius of curvature $r_1$ of the first lens L1 is $r_1$=0.290 mm.
(B) The image-side radius of curvature $r_2$ of the first lens L1 is $r_2$=0.777 mm.
(C) The back focus $b_f$ is $b_f$=0.34 mm.
(D) The distance through the atmosphere from the object-side surface of the first lens L1 to the imaging surface, or in other words the optical length d, is d=$d_1$+$d_2$+$d_3$+$d_4$+$d_5$+$d_6$+$d_7$+$b_f$=1.17 mm.
(E) The distance $D_2$ between the first lens L1 and second lens L2 is $D_2$=$d_2$+$d_3$+$d_4$=0.077 mm.
(F) The distance $D_4$ between the second lens L2 and third lens L3 is $D_4$=$d_6$=0.036 mm.
(G) The focal length $f_1$ of the first lens L1 is $f_1$=0.74 mm.
(H) The focal length $f_2$ of the second lens L2 is $f_2$=−9.52 mm.
(I) The focal length $f_3$ of the third lens L3 is $f_3$=−8.39 mm.

Hence
(1) $r_1$/$r_2$=0.290/0.777=0.3732
(2) $D_2$/f=0.077/1.00=0.077
(3) $D_4$/f=0.036/1.00=0.036
(4) d/f=1.17/1.00=1.17, and
(5) $b_f$/f=0.34/1.00=0.34.

Thus the lens system of the Embodiment 6 satisfies the conditional expressions.

As shown in Table 6, the aperture diaphragm S1 is provided in a position 0.0147 mm ($d_2$=0.0147 mm) rearward of the second surface (the image-side surface) of the first lens L1. The numerical aperture (F number) is 3.4.

Figure 22:
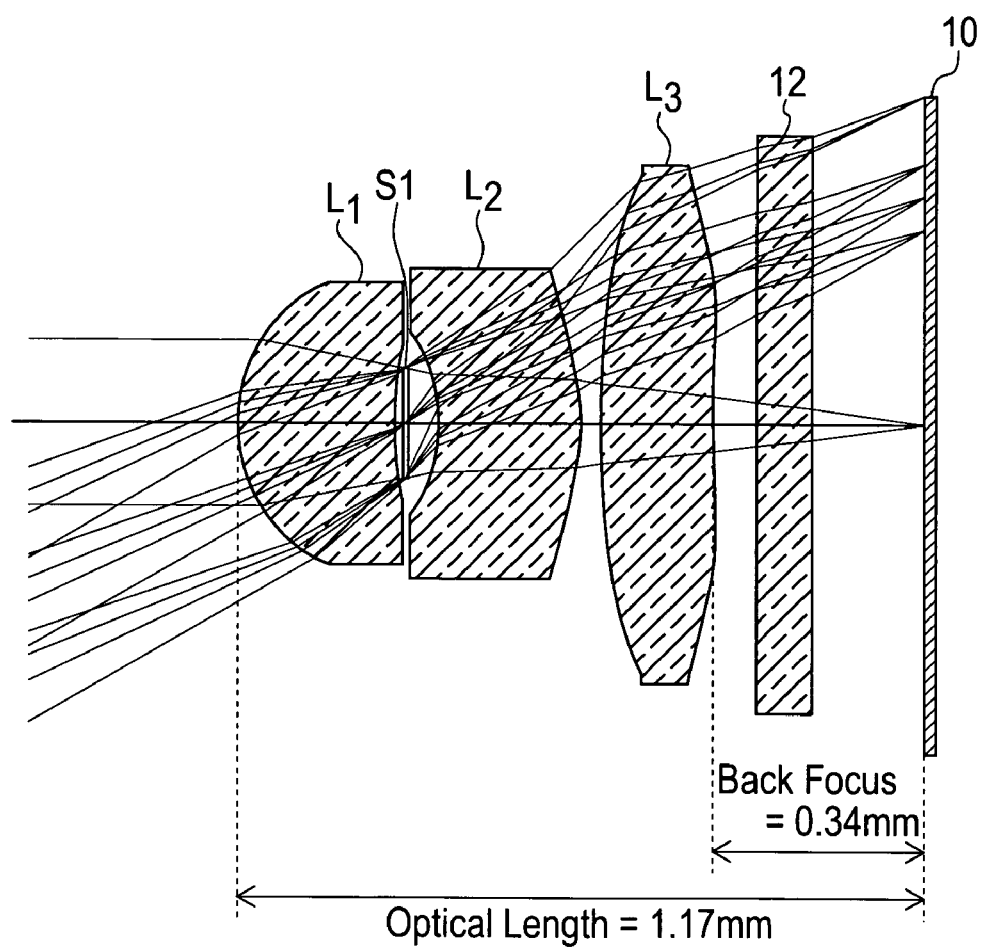
FIG. 22 is a sectional view of an imaging lens of Embodiment 6.

A sectional view of the imaging lens of the Embodiment 6 is shown in FIG. 22. The back focus in relation to a focal length of 1.00 mm is 0.34 mm, and hence a sufficient length is secured.

Figure 23:
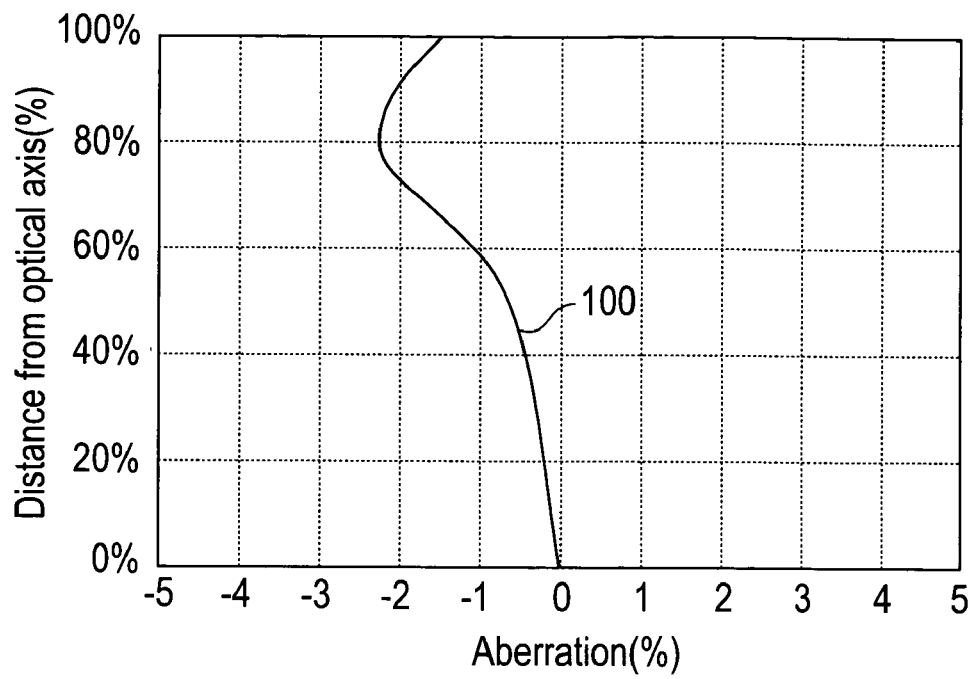
FIG. 23 is a view of distortion in the imaging lens of the Embodiment 6.
Figure 24:
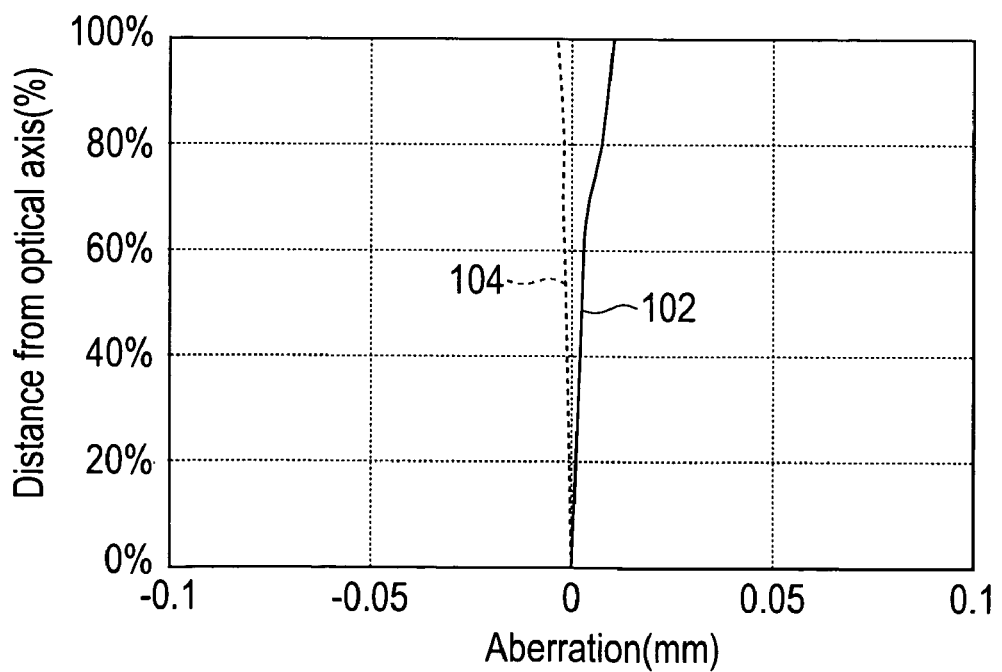
FIG. 24 is a view of astigmatism in the imaging lens of the Embodiment 6.
Figure 25:
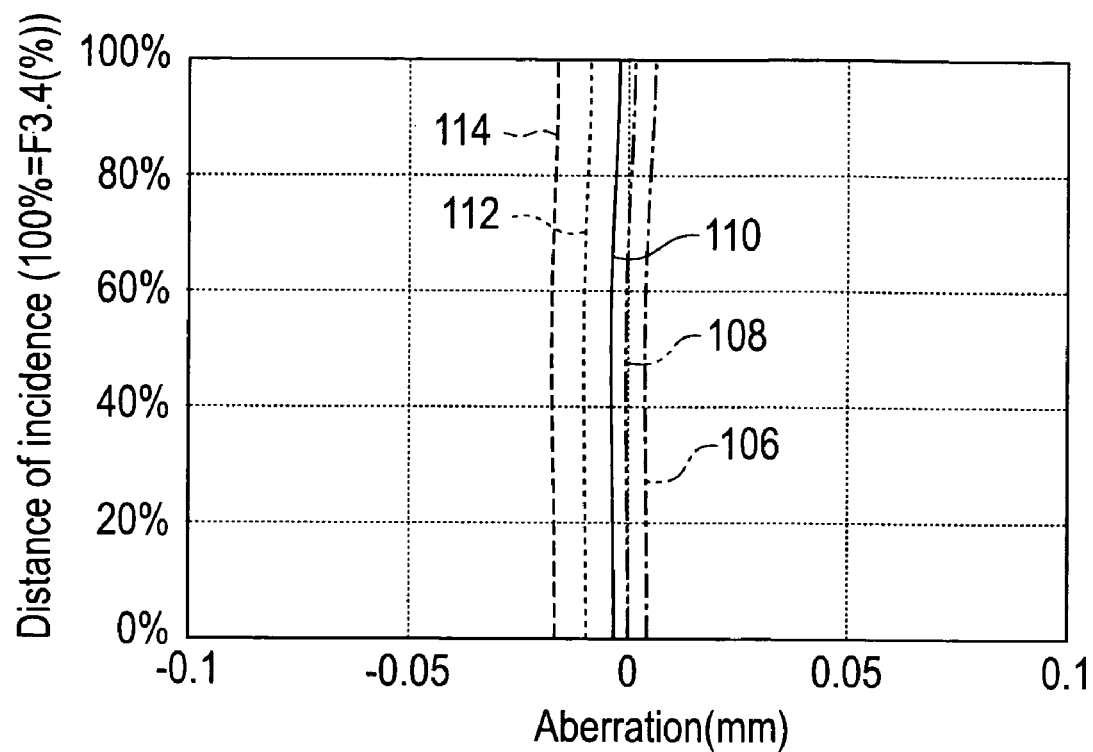
FIG. 25 is a view of chromatic and spherical aberration in the imaging lens of the Embodiment 6.

The distortion curve 100 shown in FIG. 23, the astigmatism curve (the aberration curve 102 relating to the meridional plane and the aberration curve 104 relating to the sagittal plane) shown in FIG. 24, and the chromatic and spherical aberration curve (the aberration curve 106 relating to the C line, the aberration curve 108 relating to the d line, the aberration curve 110 relating to the e line, the aberration curve 112 relating to the F line, and the aberration curve 114 relating to the g line) shown in FIG. 25 are respectively illustrated by graphs.

The ordinate of the aberration curves in FIGS. 23 and 24 illustrate the image height as a percentage of the distance from the optical axis. In FIGS. 23 and 24, 100%, 80%, 70%, and 60% correspond to 0.585 mm, 0.468 mm, 0.409 mm, and 0.351 mm respectively. The ordinate of the aberration curve in FIG. 25 indicates the distance of incidence h (F number), corresponding at its maximum to F3.4. The abscissa in FIG. 25 shows the magnitude of the aberration.

As regards distortion, the absolute value of the amount of aberration reaches a maximum of 2.2562% in an image height position of 80% (image height 0.468 mm), and hence within a range of image height 0.585 mm and below, the absolute value of the aberration amount is held within 2.2562%.

As for astigmatism, the absolute value of the aberration amount on the meridional plane reaches a maximum of 0.0104 mm in an image height position of 100% (image height 0.585 mm), and hence within a range of image height 0.585 mm and below, the absolute value of the aberration amount is held within 0.0104 mm.

As for chromatic and spherical aberration, the absolute value of the aberration curve 114 relating to the g line reaches a maximum of 0.0176 mm at a distance of incidence h of 50%, and hence the absolute value of the aberration amount is held within 0.0176 mm.

The material constituting the second lens L2 in the Embodiments 1 through 5 is ZEONEX 480R, which is a cycloolefin plastics. In the Embodiment 6, however, the material constituting the second lens L2 is polycarbonate. The refractivity on the d line of ZEONEX 480R is 1.525, whereas the refractivity on the d line of polycarbonate is 1.583, and hence polycarbonate has a higher refractivity.

Thus in the imaging lens of the Embodiments 1 through 5, where the second lens L2 is constituted using a lens made of low-refractivity ZEONEX 480R, the value of $f_3$ is a positive value, and hence the third lens L3 has a positive refractive power. On the other hand, in the imaging lens of the Embodiment 6, where the second lens L2 is constituted using a lens made of a high-refractivity polycarbonate material, the value of $f_3$ is a negative value, and hence the third lens L3 has a negative refractive power.

The first lens L1 of the imaging lens of the present invention mainly serves to determine the combined focal length as an imaging lens. The second lens L2 mainly serves to determine the resolution of the imaging lens, and hence by increasing the refractivity of the material constituting the second lens L2, the resolution can be increased. The third lens L3 serves to reduce the gradient of the light rays entering the image forming surface in relation to the optical axis. By reducing the gradient of the light rays entering the image forming surface in relation to the optical axis, the shading phenomenon whereby light is obstructed around the periphery of the lens such that the peripheral parts of the image become dark can be avoided.

When the refractivity of the material constituting the second lens L2 is increased, the refractive power of the third lens L3, or in other words the optimum value of $f_3$, changes. This is the reason why the refractive power of the third lens L3 is set to be negative in the Embodiment 6 of the present invention.

The reason why the resolution can be increased by increasing the refractivity of the material constituting the second lens L2 is that the Abbe number tends to decrease as the refractivity of the material increases. When comparing cycloolefin plastics and polycarbonate, the Abbe number of polycarbonate, which has a high refractivity, is smaller than that of cycloolefin plastics, which has a low refractivity. Hence the chromatic aberration generated by the first lens L1 having positive refractive power and the chromatic aberration generated by the second lens L2 having negative refractive power cancel each other out, as a result of which chromatic aberration can be reduced. When chromatic aberration is reduced, the resolution increases.

In a comparison of the chromatic and spherical aberration characteristics of the Embodiments 1 through 6, it can be seen by referring to FIGS. 5, 9, 13, 17, 21, and 25 that the curves illustrating the aberration values on the C line (light with a wavelength of 656.3 nm), d line (light with a wavelength of 587.6 nm), e line (light with a wavelength of 546.1 nm), F line (light with a wavelength of 486.1 nm), and g line (light with a wavelength of 435.8 nm) are gathered around zero, particularly in the Embodiment 6. It can also be seen that the aberration curves illustrating the chromatic and spherical aberration characteristics of the Embodiments 1 through 5 are not as densely gathered as the aberration curves illustrating the chromatic and spherical aberration characteristics of the Embodiment 6 in relation to light within the range of the C line to the g line, and have wider distances therebetween.

When the aberration curves indicating aberration in light within the range of the C line to the g line gather around zero, this signifies that the chromatic aberration of the imaging lens is small. Accordingly, it also signifies that the resolution of the imaging lens is high.

To describe with a specific example the fact that the resolution of the imaging lens of the Embodiment 6, in which the aberration curves indicating the chromatic and spherical aberration characteristics gather most closely around zero, is higher than that of the imaging lenses in the Embodiments 1 through 5, a comparison using an MTF (Modulation Transfer Function) is performed. MTF is a function for illustrating the absolute value of the OTF (Optical Transfer Function), which illustrates the spatial filter characteristic from the object to the image in an optical system. In other words, MTF is a function for providing the contrast between the object and the image.

Figure 26:
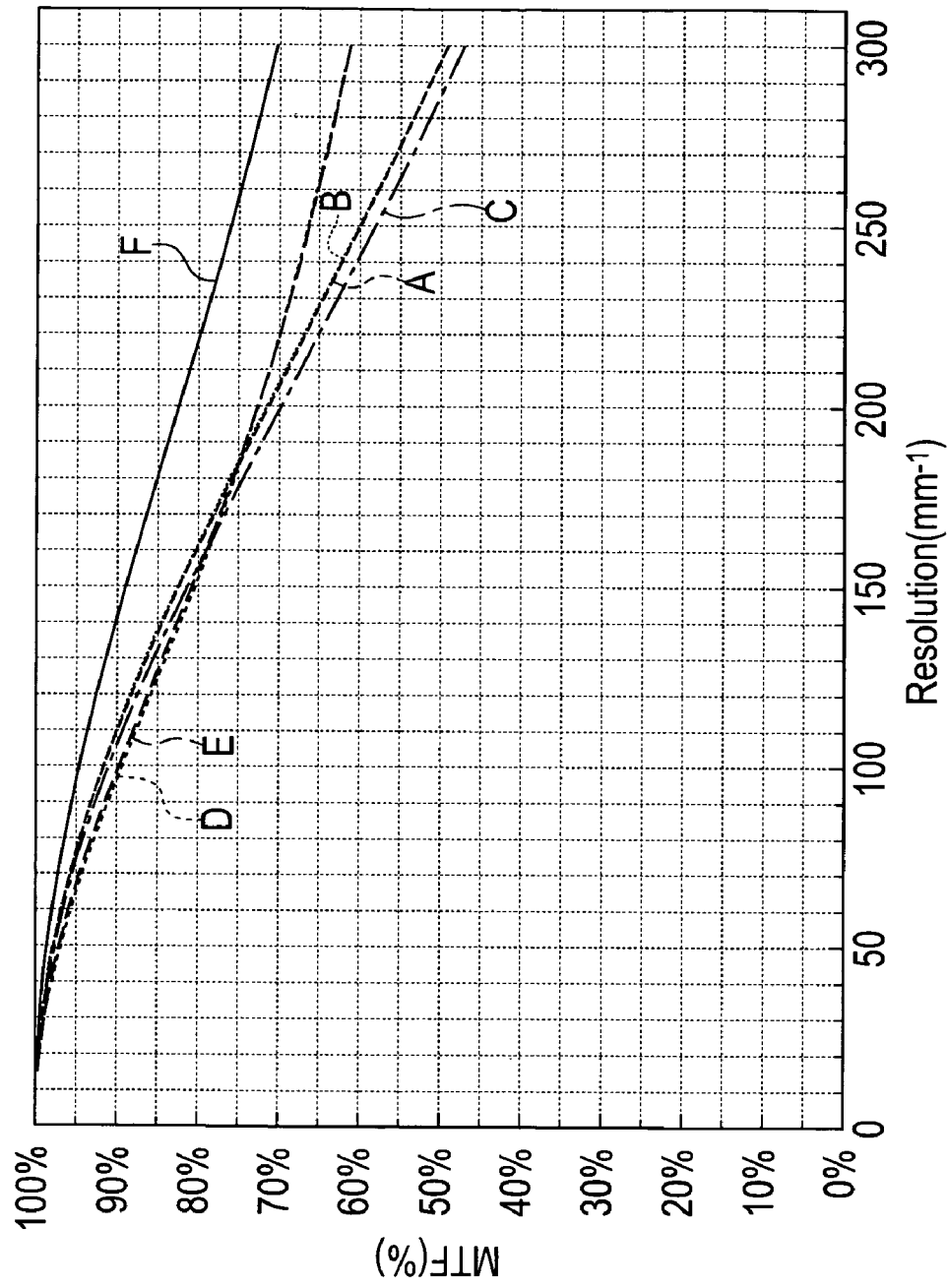
FIG. 26 is a view showing the MTF of the imaging lenses of the Embodiments 1 through 6 of the present invention.

As the MTF of an imaging lens increases, the imaging lens is able to exhibit a better resolution capability. FIG. 26 shows the MTF in the center of images captured by the imaging lenses of the Embodiments 1 through 6 of the present invention. The abscissa shows the spatial frequency scale (unit: lines per mm), and the ordinate shows the MTF value as a percentage.

In FIG. 26, the curves denoted by A, B, C, D, E, and F show the MTF corresponding to the imaging lenses of the Embodiments 1 through 6, respectively. It can be seen that the curve denoted by F exists in the highest position in FIG. 26, and hence that the MTF is greatest in the Embodiment 6. As for the MTF on the meridional plane and saggital plane in the parts removed from the center of the image captured by the imaging lens, the curve denoted by F, which illustrates the MTF characteristic in the center of the image as described above, likewise exists in the highest position in FIG. 26. Hence this is not illustrated in FIG. 26.

As can be seen from the above description, the imaging lens of the Embodiment 6, in which the material constituting the second lens L2 is polycarbonate, has the highest resolution.

Moreover, as a result of an investigation performed by the inventor of this imaging lens into the optimum combination of the first, second, and third lenses constituting the imaging lens, it was discovered that when the second lens L2 is constituted by a material having a higher refractivity (and a smaller Abbe number) than the first lens L1, as in the Embodiment 6, the optical length can be shortened. Incidentally, when comparing the value of d/f in the Embodiments 1 through 6, the Embodiment 6 has a d/f value of 1.17, which is smaller than all of the Embodiments 1 through 5.

In other words, by constructing a lens system such as that of the Embodiment 6, the resolution of the lenses can be increased beyond that of lens systems such as those in the Embodiments 1 through 5, and the optical length can be shortened. However, polycarbonate is less resistant to heat than cycloolefin plastics. Therefore, a determination should be made as to whether to employ a lens system such as that of the Embodiments 1 through 5 or a lens system such as that of the Embodiment 6 according to the object with which the imaging lens of the present invention is to be used.

It was thus learned that in all of the imaging lenses of the Embodiments 1 through 6, a sufficient performance for installation in a small camera using a CCD or CMOS as an imaging device is secured.

As is clear from the above description of the imaging lens of the present invention, by designing each of the lenses constituting the imaging lens so as to satisfy the conditional expressions (1) through (5), the problems to be solved by the present invention are solved. In other words, various aberrations are favorably corrected, and an imaging lens having a sufficient back focus and a short optical length is obtained.

Note that in the embodiments described above, the plastic material ZEONEX 480R or polycarbonate is used for the first lens L1, second lens L2, and third lens L3, but it goes without saying that plastic materials other than that cited in the embodiments, and also non-plastic materials such as molded glass or the like, for example, may be employed as long as the various conditions described in the embodiments and so on are satisfied.

Incidentally, in a portable telephone or the like, the cover glass 12, which serves as an infrared cut filter or the like, is inserted between the third lens L3 and the imaging surface $r_{11}$. According to current technology, as long as a gap of at least 0.95 mm is secured between the third lens L3 and the imaging surface $r_{11}$, the cover glass 12 may be inserted.

Further, in order to install an imaging lens in a current portable telephone or the like, the optical length of the imaging lens is preferably no more than 5 mm. According to the imaging lenses disclosed in the Embodiments 1 through 6 of the present invention, the optical length is no more than 1.30 times the focal length, as can be seen from the conditional expression 1.00<d/f<1.30 (4). Hence, assuming that the imaging lens is designed such that the optical length is 1.30 times the focal length, an optical length of 5 mm provides a focal length of 3.85 mm. As for the back focus, when f=3.85, then 1.15<$b_f$<1.92 according to the conditional expression 0.3<$b_f$/f<0.5 (5), and hence a minimum length of 1.15 mm can be secured.

When installing an imaging lens into a current portable telephone or the like, the distance from the image side surface of the third lens L3 to the imaging surface must be no less than 0.95 mm. According to the imaging lens of the present invention, a minimum back focus of 1.15 mm can be secured, and hence the required distance from the image side surface of the third lens L3 to the imaging surface can be secured to a satisfactory extent.

Further, in the imaging lens of the Embodiments 1 through 6, the height position from the optical axis of the point on the aspheric surface of the image side of the third lens L3, which is an aspheric surface, where the gradient of the tangential plane to the tangential plane of the surface apex (the perpendicular plane to the optical axis) reaches zero, or in other words the height position from the optical axis of the point on the aspheric lens where the negative power of the lens, which weakens gradually from the center of the lens toward the periphery, turns into positive power, is as follows. When the effective diameter of the lens is standardized to 1, this point exists in positions from the center of the lens toward the periphery of 58.5% in the imaging lens of the Embodiment 1, 59.5% in the imaging lens of the Embodiment 2, 28.3% in the imaging lens of the Embodiment 3, 20.4% in the imaging lens of the Embodiment 4, 29.8% in the imaging lens of the Embodiment 5, and 55.3% in the imaging lens of the Embodiment 6. As a result, even in intermediate positions between the intersecting point of the optical axis and the imaging surface and the periphery of the lens, the angle of incidence onto the imaging device does not deviate greatly from a right angle. Accordingly, since the angle of incidence of the light does not deviate greatly from a right angle even in intermediate positions from the periphery of the lens, which serves as an important part of the image, the problem of this part of the image becoming dark does not arise.

According to the imaging lens of the present invention as described above, various aberrations can be favorably corrected, and although the optical length is short, a sufficient back focus can be secured.

As described above, the imaging lens of the present invention may be used as a camera lens for installation in portable telephones, personal computers, or digital cameras, and may also be favorably applied as a camera lens for installation in PDAs (personal digital assistants), a camera lens for installation in toys comprising an image recognition function, and a camera lens for installation in monitoring, surveying, and crime-prevention devices and so on.

What is claimed is:

1. An imaging lens comprising a first lens L1, an aperture diaphragm S1, a second lens L2, and a third lens L3, and constituted such that said first lens L1, aperture diaphragm S1, second lens L2, and third lens L3 are arranged in succession from the object side to the image side, wherein said first lens L1 is a lens having a positive refractive power and a meniscus shape in which the convex surface faces the object side, said second lens L2 is a lens having a negative refractive power and a meniscus shape in which the convex surface faces the image side, and said third lens L3 is a lens in which the convex surface faces the object side, both surfaces of said first lens L1 and said second lens L2 being aspheric, and at least one surface of said third lens L3 being aspheric, and said imaging lens satisfying the following conditions:

$$0.35 < r_1/r_2 < 0.45 \quad (1)$$

$$0.07 < D_2/f < 0.1 \quad (2)$$

$$0.01 < D_4/f < 0.04 \quad (3)$$

$$1.00 < d/f < 1.30 \quad (4)$$

$$0.3 < b_f/f < 0.5 \quad (5)$$

where f is the combined focal length of the imaging lens, $r_1$ is the radius of curvature (axial radius of curvature) of the object-side surface of the first lens L1 in the vicinity of the optical axis, $r_2$ is the radius of curvature (axial radius of curvature) of the image-side surface of the first lens L1 in the vicinity of the optical axis, $D_2$ is the distance between the first lens L1 and second lens L2, $D_4$ is the distance between the second lens L2 and the third lens L3, d is the distance (atmospheric) from the object-side surface of the first lens L1 to the imaging surface, and $b_f$ is the distance (atmospheric) from the image-side surface of the third lens L3 to the imaging surface.

2. The imaging lens according to claim 1, wherein said first lens L1, said second lens L2, and said third lens L3 constituting said imaging lens are formed from a material having an Abbe number within a range of thirty to sixty.

3. The imaging lens according to claim 1, wherein said first lens L1, said second lens L2, and said third lens L3 constituting said imaging lens are formed using cycloolefin plastics as a material.

4. The imaging lens according to claim 1, wherein said first lens L1 and said third lens L3 constituting said imaging lens are formed using cycloolefin plastics as a material, and said second lens L2 is formed using polycarbonate as a material.

5. The imaging lens according to claim 1, wherein said first lens L1 and said third lens L3 constituting said imaging lens are formed using cycloolefin plastics as a material, said second lens L2 is formed using polycarbonate as a material, and said third lens L3 is a lens having a negative refractive power and a meniscus shape in which the convex surface faces the object side.

* * * * *